United States Patent
Matsuura et al.

(10) Patent No.: US 10,656,269 B2
(45) Date of Patent: May 19, 2020

(54) ADJACENT VEHICLE DETECTION DEVICE

(71) Applicants: NIPPON SOKEN, INC., Nishio, Aichi-pref. (JP); DENSO CORPORATION, Kariya, Aichi-pref. (JP)

(72) Inventors: Mitsuyasu Matsuura, Chiryu (JP); Akio Nakano, Anjo (JP); Tooru Yoshida, Kariya (JP)

(73) Assignees: SOKEN, INC., Nisshin, Aichi-pref. (JP); DENSO CORPORATION, Kariya, Aichi-pref. (JP)

( * ) Notice: Subject to any disclaimer, the term of this patent is extended or adjusted under 35 U.S.C. 154(b) by 299 days.

(21) Appl. No.: 15/284,568

(22) Filed: Oct. 4, 2016

(65) Prior Publication Data
US 2017/0023675 A1  Jan. 26, 2017

Related U.S. Application Data

(62) Division of application No. 14/412,581, filed as application No. PCT/JP2013/004182 on Jul. 5, 2013, now Pat. No. 9,599,710.

(30) Foreign Application Priority Data

Jul. 6, 2012  (JP) ................... 2012-152760
Jun. 6, 2013  (JP) ................... 2013-120044

(51) Int. Cl.
*G01S 15/93* (2020.01)
*G01S 15/931* (2020.01)
*G08G 1/16* (2006.01)

(52) U.S. Cl.
CPC ............ *G01S 15/931* (2013.01); *G08G 1/166* (2013.01); *G08G 1/167* (2013.01); *G01S 2015/933* (2013.01)

(58) Field of Classification Search
CPC ...... G08G 1/166; G08G 1/167; G01S 15/931; G01S 2015/933
See application file for complete search history.

(56) References Cited

U.S. PATENT DOCUMENTS 4,920,520 A    4/1990  Gobel et al.
9,355,319 B2 *  5/2016  Jang ................... G06K 9/00791
2008/0122680 A1  5/2008  Morinaga et al.
2012/0235852 A1  9/2012  Hattori et al.
2013/0024103 A1  1/2013  Schneider
2014/0336842 A1 * 11/2014  Jang ................... G06K 9/00805
                                                        701/1
2015/0009330 A1 *  1/2015  Sobue ................... G08G 1/166
                                                        348/148
2015/0035663 A1  2/2015  Sugano et al.

FOREIGN PATENT DOCUMENTS

| | | |
|---|---|---|
| JP | H05223933 A | 9/1993 |
| JP | H08184670 A | 7/1996 |
| JP | 2000207697 A | 7/2000 |
| JP | 2003294838 A | 10/2003 |
| JP | 2004322916 A | 11/2004 |
| JP | 2005-107693 A | 4/2005 |
| JP | 2005145196 A | 6/2005 |
| JP | 2007091102 A | 4/2007 |
| JP | 2008-128946 A | 6/2008 |
| JP | 2009043058 A | 2/2009 |
| JP | 2012194656 A | 10/2012 |
| WO | WO-2011091934 A1 | 8/2011 |

OTHER PUBLICATIONS

International Search Report and Written Opinion (in Japanese with English translation) for PCT/JP2013/004182, dated Aug. 13, 2013; ISA/JP.

\* cited by examiner

*Primary Examiner* — Jerrah Edwards

(74) *Attorney, Agent, or Firm* — Harness, Dickey & Pierce, P.L.C.

(57) ABSTRACT

A parallel running vehicle detecting apparatus is provided, which includes a first distance sensor for detecting distance of an object in a first detection area on a rear lateral side of a vehicle, a second distance sensor for detecting distance of an object in a second detection area, a parallel running vehicle detector for detecting a parallel running vehicle based on detections of the first and second distance sensors, and a storage for storing a detection distance history of the second distance sensor. The parallel running vehicle detector is provided with multiple determination conditions for determining whether the object detected by the first distance sensor is the parallel running vehicle, and changes the parallel running vehicle determination condition based on the detection distance history stored in the storage.

2 Claims, 15 Drawing Sheets

ADJACENT VEHICLE DETECTION DEVICE

CROSS-REFERENCE TO RELATED APPLICATIONS

This application is a divisional application U.S. Ser. No. 14/412,581 filed on Jan. 2, 2015 which is a U.S. National Phase Application under 35 U.S.C. 371 of International Application No. PCT/JP2013/004182 filed on Jul. 5, 2013 and published in Japanese as WO 2014/006919 A1 on Jan. 9, 2014 which is based on and claims the benefit of priority from Japanese Patent Application 2012-152760 filed on Jul. 6, 2012 and Japanese Patent Application 2013-120044 filed on Jun. 6, 2013. The entire disclosures of all of the above applications are incorporated herein by reference.

FIELD OF THE INVENTION

The present disclosure relates to a parallel running vehicle detecting apparatus which detects a parallel running vehicle in a blind spot on a vehicle rear lateral side.

BACKGROUND

An apparatus disclosed by Patent Document 1 is known as an apparatus which detects a parallel running vehicle existing in a blind spot on a vehicle rear lateral side. In the apparatus disclosed by Patent Document 1, only when an object is not detected by a front sensor but detected by a back sensor, the object is determined as a parallel running vehicle. Accordingly, the possibility is reduced in erroneously detecting a guard rail or a wall as a parallel running vehicle.

PRIOR ART LITERATURES

Patent Literature

Patent Literature 1 Japanese published unexamined patent application No. Hei 05(1993)-223933

SUMMARY OF INVENTION

However, according to studies by the inventors of the present invention, when a curbstone exists in the detection range of a front sensor and a back sensor, the curbstone cannot be always detected by the front sensor and the back sensor, but may be detected or may not be detected by either or both of the sensors. In addition, there is a rare chance that a road surface is detected as an obstacle on a road.

In order to suppress such an erroneous detection of identifying these objects as a parallel running vehicle, it is thinkable to increase the number of times of detection employed for the determination of a parallel running vehicle. However, it is likely that the increase in the number of times of detection will result in the degradation of the responsiveness.

The present disclosure has been made in view of such an issue and has an object to provide a parallel running vehicle detecting apparatus which can suppress erroneous detection and degradation of the responsiveness.

A parallel running vehicle detecting apparatus of the first example is configured with a first distance sensor, a second distance sensor, a parallel running vehicle detector, and a storage. The first distance sensor is mounted in a vehicle and detects a distance to an object which exists in a first detection area on a rear lateral side of the vehicle. The second distance sensor is mounted in the vehicle and detects a distance to an object which exists in a second detection area having at least a part outside the first detection area. The parallel running vehicle detector detects a parallel running vehicle on the basis of the detection situation of the first distance sensor and the detection situation of the second distance sensor. The storage stores the history of detection distance by the second distance sensor. The parallel running vehicle detector is provided with a plurality of parallel running vehicle determination conditions for determining whether an object detected by the first distance sensor is a parallel running vehicle. The parallel running vehicle detector changes the parallel running vehicle determination condition, based on the history of the detection distance stored in the storage.

When it is aimed to prevent the erroneous determination to identify a curbstone, etc. as a parallel running vehicle under one determination condition, it becomes necessary to increase the number of times of determining, resulting in the degradation of the responsiveness. On the other hand, in the parallel running vehicle detecting apparatus described above, the parallel running vehicle determination condition is changed based on the detection history of the second distance sensor. Accordingly, the parallel running vehicle determination condition employed when it is determined that a curbstone, etc. may exist according to the detection history of the second distance sensor is different from the parallel running vehicle determination condition employed when it is determined that a curbstone, etc. does not exist. As a result, without increasing the number of times of determining, it is possible to suppress the erroneous determination and identification of a curbstone, etc. as a parallel running vehicle.

A parallel running vehicle detecting apparatus of the second example is configured with a first distance sensor, a second distance sensor, and a parallel running vehicle detector. The first distance sensor is mounted in a vehicle and detects a distance to an object which exists in a first detection area on a rear lateral side of the vehicle. The second distance sensor is mounted in the vehicle and detects a distance to an object which exists in a second detection area having at least a part outside the first detection area. The parallel running vehicle detector detects a parallel running vehicle on the basis of the detection situation of the first distance sensor and the detection situation of the second distance sensor. The parallel running vehicle detector determines whether a parallel running vehicle is detected, on the basis of the detection result of the first distance sensor. In addition, when an object is detected by the second distance sensor, a suspending period or a suspending distance is determined on the basis of the distance to the object, and the determining on the basis of the detection result of the first distance sensor is performed after the suspending period elapses or the suspending distance is traveled by the vehicle.

According to the parallel running vehicle detecting apparatus described above, when the second distance sensor detects an object and when this object is a stationary object, a suspending period or suspending distance is set up as a period or distance in which this object passes through the detection area of the first distance sensor. The determining on the basis of the detection result of the first distance sensor is performed after the suspending period elapses or the suspending distance is traveled by the vehicle. Therefore, it is possible to suppress erroneously detecting the stationary object detected by the second distance sensor as a parallel running vehicle. Except for the suspending period or except for a time when the vehicle is traveling the suspending distance, the need of increasing the number of times of determining in order to suppress erroneous detection is reduced. That is, except for the suspending period or except for a time when the vehicle is traveling the suspending distance, it is possible to decrease the number of times of determining; accordingly it is possible to suppress the degradation of the responsiveness.

A parallel running vehicle detecting apparatus of the third example is configured with a first distance sensor which is mounted in a vehicle and detects a distance to an object which exists in a first detection area on a rear lateral side of the vehicle; and a parallel running vehicle detector which detects a parallel running vehicle from the detection situation of the first distance sensor. When the object is determined to be approaching on the basis of the change of distance to the object detected by the first distance sensor, a first reference value is employed as a reference value to compare with the number of times of detection to be used to determine the object as a parallel running vehicle. When the distance between the object and the own vehicle is determined to be unchanging, a second reference value larger than the first reference value is employed as the reference value to compare with the number of times of detection to be used to determine the object as a parallel running vehicle.

While the vehicle is traveling, a stationary object which exists continuously, such as a curbstone, cannot be detected by the first distance sensor each time, even if they are in the detection area of the first distance sensor, however, it is common that the stationary object can be detected at comparatively low frequency because of the influence of the distance to the vehicle and the reflective direction of a sensor signal. On the contrary, when a parallel running vehicle is standing still at a place detectable by the first distance sensor, it is possible to detect it at high frequency.

Accordingly, in the parallel running vehicle detecting apparatus, when it is possible to determine that the object detected by the first distance sensor is standing still, it is determined whether the object is a parallel running vehicle by comparing with the second reference value which is larger than the first reference value employed in determining that the object detected by the first distance sensor is approaching. According to such procedure, when the object determined to be standing still is a stationary object, it is possible to suppress erroneously detecting the stationary object as a parallel running vehicle. The determination of a parallel running vehicle with the use of the second reference value is restricted to the case where the object can be determined to be standing still. When it is possible to determine that the object is approaching, the determination is made with the use of the first reference value smaller than the second reference value. Therefore, it is possible to suppress the degradation of the detection responsiveness.

A parallel running vehicle detecting apparatus of the fourth example is configured with a first distance sensor, a second distance sensor, and a parallel running vehicle detector. The first distance sensor is mounted in a vehicle and detects a distance to an object which exists in a first detection area on a rear lateral side of the vehicle. The second distance sensor is mounted in the vehicle and detects a distance to an object which exists in a second detection area having at least a part outside the first detection area. The parallel running vehicle detector detects a parallel running vehicle on the basis of the detection situation of the first distance sensor and the detection situation of the second distance sensor. The parallel running vehicle detector determines whether a parallel running vehicle is detected, on the basis of the detection result of the first distance sensor. However, when an object is detected by the second distance sensor and when the distance to the object detected by the first distance sensor is larger than the distance to the object detected by the second distance sensor, the object detected by the first distance sensor is not determined to be a parallel running vehicle.

According to the present parallel running vehicle detecting apparatus, when the second distance sensor has detected the object, it is determined whether the object detected by the first distance sensor is a parallel running vehicle, only when the first detection distance to the object detected by the first distance sensor is smaller than the second detection distance to the object detected by the second distance sensor. Therefore, it is possible to detect a motorcycle which is going to pass through the immediate side of an own vehicle as a parallel running vehicle, and at the same time, it is possible to suppress the erroneous detection to identify a stationary object, such as a curbstone and an electric pole, as a parallel running vehicle. Since it is possible to suppress the erroneous detection in this way, the need of increasing the number of times of determining in order to suppress the erroneous detection is reduced. Therefore, it is possible to suppress the degradation of the responsiveness.

BRIEF DESCRIPTION OF THE DRAWINGS

The above and other purposes, the feature, and the advantage of the present disclosure will become clarified from the detailed description given hereinafter with reference to the accompanying drawings, in which.

EMBODIMENTS FOR CARRYING OUT THE INVENTION

Embodiment 1

Figure 1:
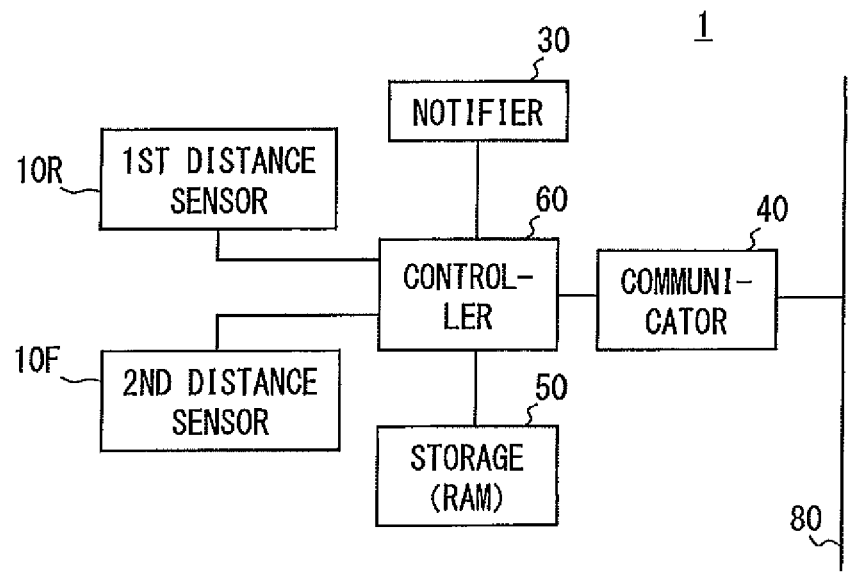
FIG. 1 is a block diagram illustrating a configuration of a parallel running vehicle detecting apparatus according to Embodiment 1.

Hereinafter, embodiments of the present disclosure will be explained in detail with reference to the accompanying drawings. As illustrated in FIG. 1, a parallel running vehicle detecting apparatus 1 according to Embodiment 1 is provided with a first distance sensor 10R, a second distance sensor 10F, a notifier 30, a communication device 40, a storage 50, and a controller 60. The parallel running vehicle detecting apparatus 1 configured in this way is mounted in a vehicle 70 (refer to FIG. 2).

The pair of the first distance sensor 10R and the second distance sensor 10F is ultrasonic sensors, and they are arranged so as to have a detection area nearest to a vehicle and on a lateral side of either right or left of the vehicle. Here, the lateral side does not restrict the position in the anteroposterior direction to the range from a front end to a back end of the vehicle; however, it also includes a diagonal front (front lateral side) and a diagonal rear (rear lateral side) of the vehicle.

Figure 2:
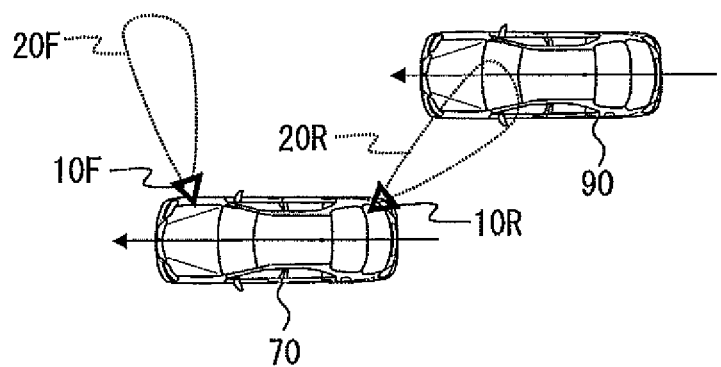
FIG. 2 is a drawing illustrating an example of the arrangement position of a first distance sensor and a second distance sensor.

In the example of arrangement of the first distance sensor 10R and the second distance sensor 10F illustrated in FIG. 2, the first distance sensor 10R is arranged at the right rear corner of the vehicle, and the second distance sensor 10F is arranged in a position anterior to the first distance sensor 10R, specifically at the right front corner of the vehicle.

A first detection area 20R where an object is detectable with the first distance sensor 10R is an area which develops to the diagonally right rear of the vehicle 70 from the installed position of the first distance sensor 10R. The first detection area 20R includes in part or all the area of blind spots for a driver. For example, it is desirable to install the first detection area 20R at the angle of 40 to 60 degrees with reference to the vehicle backward as 0 degree.

On the other hand, a second detection area 20F where an object is detectable with the second distance sensor 10F is an area which develops to the right lateral side of the vehicle 70 from the installed position of the second distance sensor 10F. Therefore, the second detection area 20F is located anterior to the first detection area 20R in the traveling direction of the vehicle 70.

Each of the detection areas 20R and 20F has wider detection range as it departs from the distance sensors 10R and 10R, respectively, in the width direction (the direction which intersects perpendicularly with the transmission direction of ultrasonic waves). The length of these detection areas 20R and 20F in the transmission direction of ultrasonic waves is about 4 m, for example.

In FIG. 2, the first distance sensor 10R and the second distance sensor 10F are installed only on the right-hand side of the vehicle. However, the first distance sensor 10R and the second distance sensor 10F may be similarly installed also on the left-hand side of the vehicle, or only on the left-hand side.

Returning to FIG. 1, the notifier 30 includes a speaker or a display device. When a parallel running vehicle is detected, the notifier 30 notifies it to a driver of the vehicle 70. However, the notification from the speaker is not provided at all times, but it is restricted only at the time of operating a direction indicator. The communication device 40 is coupled to a CAN 80 and receives various signals, such as a vehicle velocity signal, a steering angle signal, and a yaw rate signal, from other in-vehicle apparatuses via the CAN 80. A signal which indicates that the direction indicator is operating is also received via the CAN 80.

Here, a RAM is employed for the storage 50. The storage 50 stores detection distances d1 and d2 detected by the first distance sensor 10R and the second distance sensor 20F, a flag to be described later, and others.

The controller 60 issues an instruction for transmission and reception to the first distance sensor 10R and the second distance sensor 10F. The period of the instruction for transmission and reception is 50 msec, for example. Issuing an instruction for transmission and reception, the controller 60 acquires signals from the first distance sensors 10R and the second distance sensor 10F, and detects a parallel running vehicle 90 (refer to FIG. 2).

The processing to detect a parallel running vehicle 90 (hereinafter referred to as the parallel running vehicle detection) is explained later in full detail with reference to the flow chart illustrated in FIG. 4. The present parallel running vehicle detection includes the parallel running vehicle determination in order to suppress erroneously determining an object which is not a parallel running vehicle, such as a curbstone, as a parallel running vehicle.

In the parallel running vehicle determination, when the first distance sensor 10R has detected an object, immediate determination that a parallel running vehicle has been detected is not made from the detection result, but it is determined whether the object is a parallel running vehicle or not.

In the parallel running vehicle determination, it is determined whether the object detected by the first distance sensor 10R is a parallel running vehicle, by comparing the distance d1 detected by the first distance sensor 10R with the distance d2 detected by the second distance sensor 10F.

Figure 3A:
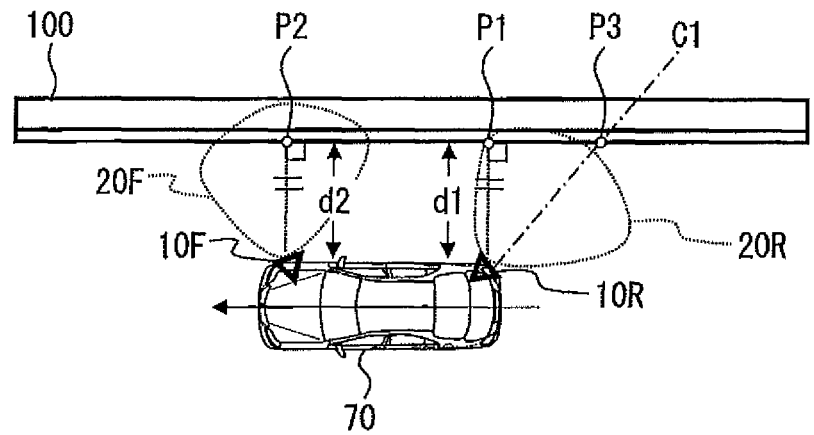
FIG. 3A is an explanatory drawing illustrating technical principle of parallel running vehicle determination.

In the principle explanatory diagram illustrated in FIG. 3A, the vehicle 70 is traveling in parallel with a curbstone 100. From the first distance sensor 10R, an ultrasonic wave is transmitted with the spread expressed by the first detection area 20R. Here, the angle of incidence and the angle of reflection of the ultrasonic wave are nearly equal. Therefore, even when the first distance sensor 10R transmits an ultrasonic wave towards the diagonal rear of the vehicle 70, the reflected wave from the direction of the first distance sensor 10R. In the case of an object such as a curbstone 100 having a plane parallel to the lateral side of the vehicle 70, the first distance sensor 10R detects a reflected wave of the ultrasonic wave which is emitted from the first distance sensor 10R and enters perpendicularly to the plane of the curbstone 100 (that is, in the width direction of the vehicle 70).

Therefore, the first distance sensor 10R detects a distance d1 (hereinafter called the first detection distance) to P1.

For the same reason, the second distance sensor 10F also detects a distance d2 (hereinafter called the second distance) to P2 whose position in the anteroposterior direction of the vehicle 70 coincides with the second distance sensor 10F.

Figure 3B:
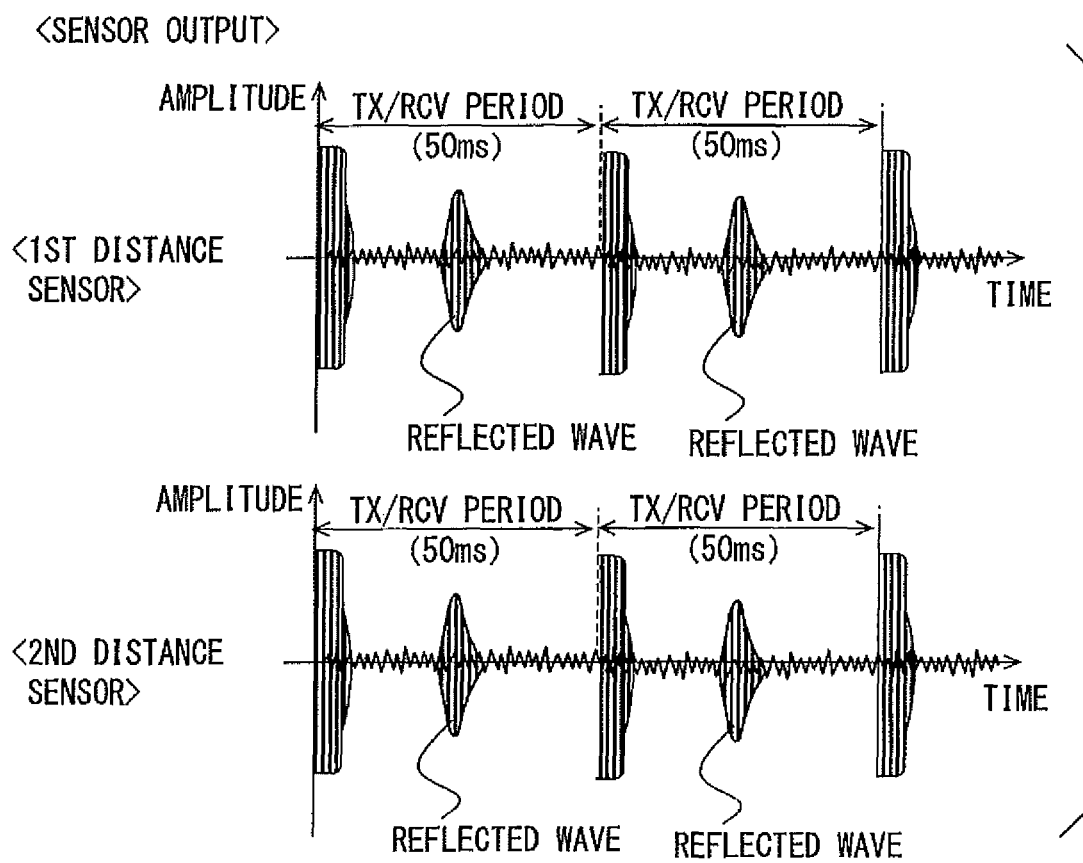
FIG. 3B is an explanatory drawing illustrating technical principle of parallel running vehicle determination.

When an object exists continuously in parallel with the vehicle 70, like the curbstone 100, as illustrated in FIG. 3B, the signal outputted by the first distance sensor 10R and the signal outputted by the second distance sensor 10F will detect reflected waves at the same time, if the instructions for transmission are issued at the same timing. The parallel running vehicle determination is performed, utilizing the technical principle illustrated in FIG. 3A and FIG. 3B described above.

The controller 60 performs in succession the parallel running vehicle detection S10 (FIG. 4) including the parallel running vehicle determination, when the vehicle 70 makes the forward traveling.

First, at Step S11, an instruction for transmission and reception is issued to the first distance sensor 10R and the second distance sensor 10F.

At Step S12, it is determined whether the second distance sensor 10F has detected an object. The controller 60 determines whether the distance sensors 10R and 10F have detected an object, by acquiring the signals from the distance sensors 10R and 10F and performing, for example, a threshold determination with respect to the intensity of the acquired signals.

When the second distance sensor 10F has not detected an object (NO at S12), the number of times of non-detection is incremented by +1 at Step S13.

When the second distance sensor 10F has detected an object, on the other hand (YES at S12), at Step S14, the detected distance (hereinafter, the second detection distance d2) is stored to the storage 50, and the number of times of detection of the metric division to which the second detection distance d2 belongs is incremented by +1. The metric divisions are obtained by dividing the detection range of the distance sensors 10R and 10F into several divisions, for example, by dividing the detection range from 0 to 4 m to every 50 cm.

After performing Step S13 or Step S14, Step S15 is performed. At Step S15, it is determined whether a curbstone flag should be set to ON. The present determining is performed in terms of Expression 1.

(number of times of detection for each metric division/(total number of times of detection+number of times of non-detection))≥predetermined value $N$   (Expression 1)

In Expression 1, the total number of times of detection is the total value of the number of times of detection in all the metric divisions. The denominator of the left-hand side of Expression 1 is assumed to have a constant value. Therefore, the left-hand side of Expression 1 indicates a ratio of the number of times at which an object at the same distance is detected, to the constant counts of processing. When the inequality of Expression 1 is satisfied in at least one of the metric divisions, the curbstone flag is set to ON, and when the inequality is not satisfied in any of the metric divisions, the curbstone flag is set to OFF. When the curbstone flag is at ON, it signifies that an object such as a curbstone is continuously detected in the same metric division.

At Step S16, it is determined whether the first distance sensor 10R has detected an object. When the first distance sensor 10R has not detected an object (NO at S16), the flow advances to Step S17 and determines that no object is detected. Even when the first distance sensor 10R has detected an object (YES at S16), it is not simply determined that a parallel running vehicle has been detected, but further determining at Step S18 is performed.

At Step S18, it is determined whether the curbstone flag is at ON and whether the first detection distance d1 is the distance included in the metric division at which the curbstone flag has been determined to be at ON. When there are two or more metric divisions at which the curbstone flag has been determined to be at ON, the latter determining is performed using each of the metric divisions.

The latter determining is performed to determine substantially whether the first detection distance d1 is nearly equal to the second detection distance d2 stored in the storage 50. When the curbstone flag is at ON and the first detection distance d1 is nearly equal to the second detection distance d2, it is highly possible that the object detected by the first distance sensor 10R is an object other than a parallel running vehicle, such as a curbstone. Accordingly, when the determining at Step S18 is YES, the flow advances to Step S19, and it is determined that the object detected by the first distance sensor 10R is an object other than a parallel running vehicle.

On the other hand, when the determining at Step S18 is NO, the flow advances to Step S20, and it is determined that the object detected by the first distance sensor 10R is a parallel running vehicle. The determining at Step S18 becomes NO when at least one of the followings is satisfied: (1) the curbstone flag is at OFF, and (2) the first detection distance d1 is not the distance included in the metric divisions at which the curbstone flag has been determined to be at ON. When (1) is satisfied, it signifies the determination that a curbstone, etc. do not exist, therefore, it is determined that the object detected by the first distance sensor 10R is not a curbstone, etc., but that it is a parallel running vehicle. When (2) is satisfied, the distance to a curbstone, etc. (the second detection distance d2) is different from the first detection distance d1, therefore, it can be assumed that the object detected at the first detection distance d1 is not a curbstone, etc. Accordingly, also when (2) is satisfied, it is determined that the object is a parallel running vehicle.

When it is determined at Step S20 that the object is a parallel running vehicle, at Step S21, the notifier 30 notifies that a parallel running vehicle has been detected.

When one of Step S17, Step S19, and Step S21 has been performed, the flow advances to Step S22. At Step S22, the oldest data is deleted among multiple data stored in the storage 50 and employed for determining whether the curbstone flag is set to ON. Subsequently, the flow returns to Step S11.

The parallel running vehicle detecting apparatus 1 according to Embodiment 1 explained above is provided with not only the first distance sensor 10R for detecting a parallel running vehicle located in the area on the rear lateral side of the vehicle 70 in a blind spot for a driver, but also the second distance sensor 10F. In addition to the object detection situation of the first distance sensor 10R, the object detection situation of the second distance sensor 10F is also employed in performing the parallel running vehicle detection (S10). In the parallel running vehicle detection, the parallel running vehicle determination condition is changed according to the object detection history of the second distance sensor 10F.

Specifically, when it is determined that an object such as a curbstone exists continuously in parallel with the vehicle 70, based on the history of detecting with the second distance sensor 10F the predetermined number of times in which the present detection is the newest (the curbstone flag is at ON at S15), it is determined whether the object detected by the first distance sensor 10R is a parallel running vehicle using the first parallel running vehicle determination condition, which is configured so as to suppress the erroneously identifying a curbstone, etc. as a parallel running vehicle. That is, when the first detection distance d1 is in the metric division which is considered to be the distance to a curbstone, etc. (YES at S18), an object detected by the first distance sensor 10R is not determined to be a parallel running vehicle, and when the curbstone flag is at ON but the first detection distance d1 is not in the metric division which is considered to be the distance to a curbstone, etc. (NO at S18), the object is determined as a parallel running vehicle (S20).

On the other hand, when it is determined that an object such as a curbstone does not exist continuously in parallel with the vehicle 70 (the curbstone flag is at OFF at S15), it is determined whether the object detected by the first distance sensor 10R is a parallel running vehicle using the second parallel running vehicle determination condition, which is set up assuming that a curbstone, etc. does not exist. That is, when the first distance sensor 10R has detected an object (YES at S16, NO at S18), the object is determined to be a parallel running vehicle (S20) without regard to whether the first detection distance d1 is in the metric division which is considered to be the distance to a curbstone, etc. Each of the first and the second parallel running vehicle determination conditions is very simple determination conditions; however, one or both of the determination conditions to more complicated conditions may be changed.

As described above, in Embodiment 1, the curbstone flag is set to ON or OFF on the basis of the object detection history of the second distance sensor 10F, and the parallel running vehicle determination condition is changed between the first parallel running vehicle determination condition and the second parallel running vehicle determination condition, depending on ON or OFF of the curbstone flag. Therefore, without increasing the number of times of determining aimlessly, it is possible to suppress the erroneously identifying of a curbstone, etc. as a parallel running vehicle.

Embodiment 2

Next, Embodiment 2 is explained. In the explanation of Embodiment 2 and subsequent embodiments, the same elements as explained already are referred to by the same references as used in previous embodiments, unless otherwise referred to in particular.

In Embodiment 1, the first parallel running vehicle determination condition takes into consideration whether the first detection distance d1 is in the metric division that is considered to be the distance to a curbstone, etc., whereas the second parallel running vehicle determination condition does not take this into consideration.

In Embodiment 2, in addition to the first parallel running vehicle determination condition and the second parallel running vehicle determination condition, another condition is provided which determines whether, within a predetermined time or a predetermined mileage, the number of times the object is detected in the same metric division has exceeded a predetermined value.

Furthermore, in the first parallel running vehicle determination condition, when the first detection distance d1 is in the same metric division as the second detection distance d2, the predetermined value is made larger than when the first detection distance d1 is in a different metric division from the second detection distance d2. For example, when the first detection distance d1 is in a different metric division from the second detection distance d2, the predetermined value is set to 2 to 3. When the first detection distance d1 is in the same metric division as the second detection distance d2, the predetermined value is set to 5 to 6.

Figure 4:
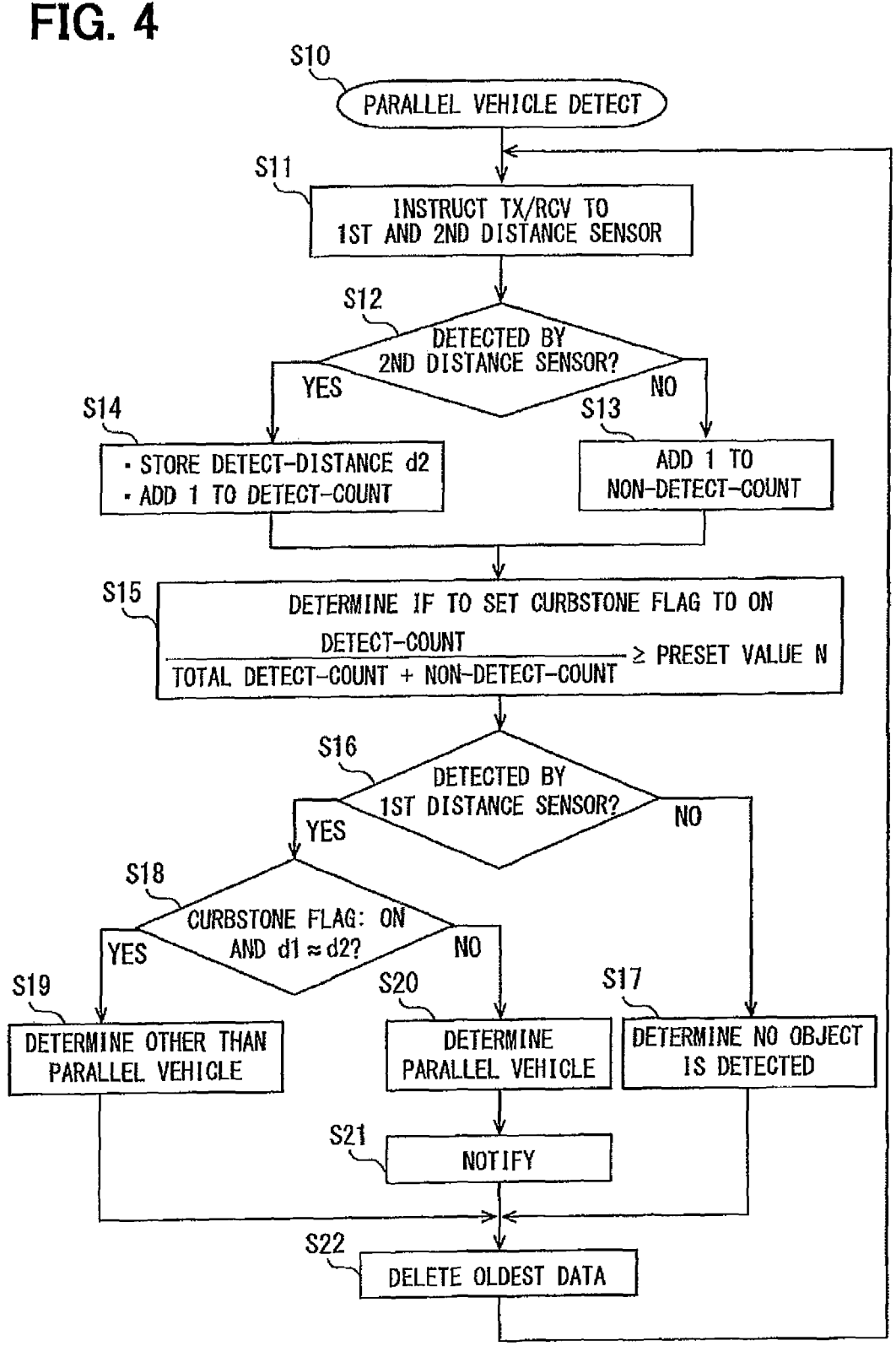
FIG. 4 is a flow chart illustrating the parallel running vehicle detection performed by a controller in Embodiment 1.

When Embodiment 2 is applied to FIG. 4, at Step S18, if the curbstone flag is at ON, the first parallel running vehicle determination condition is employed. If the curbstone flag is at OFF, the second parallel running vehicle determination condition is employed.

Embodiment 3

Figure 5:
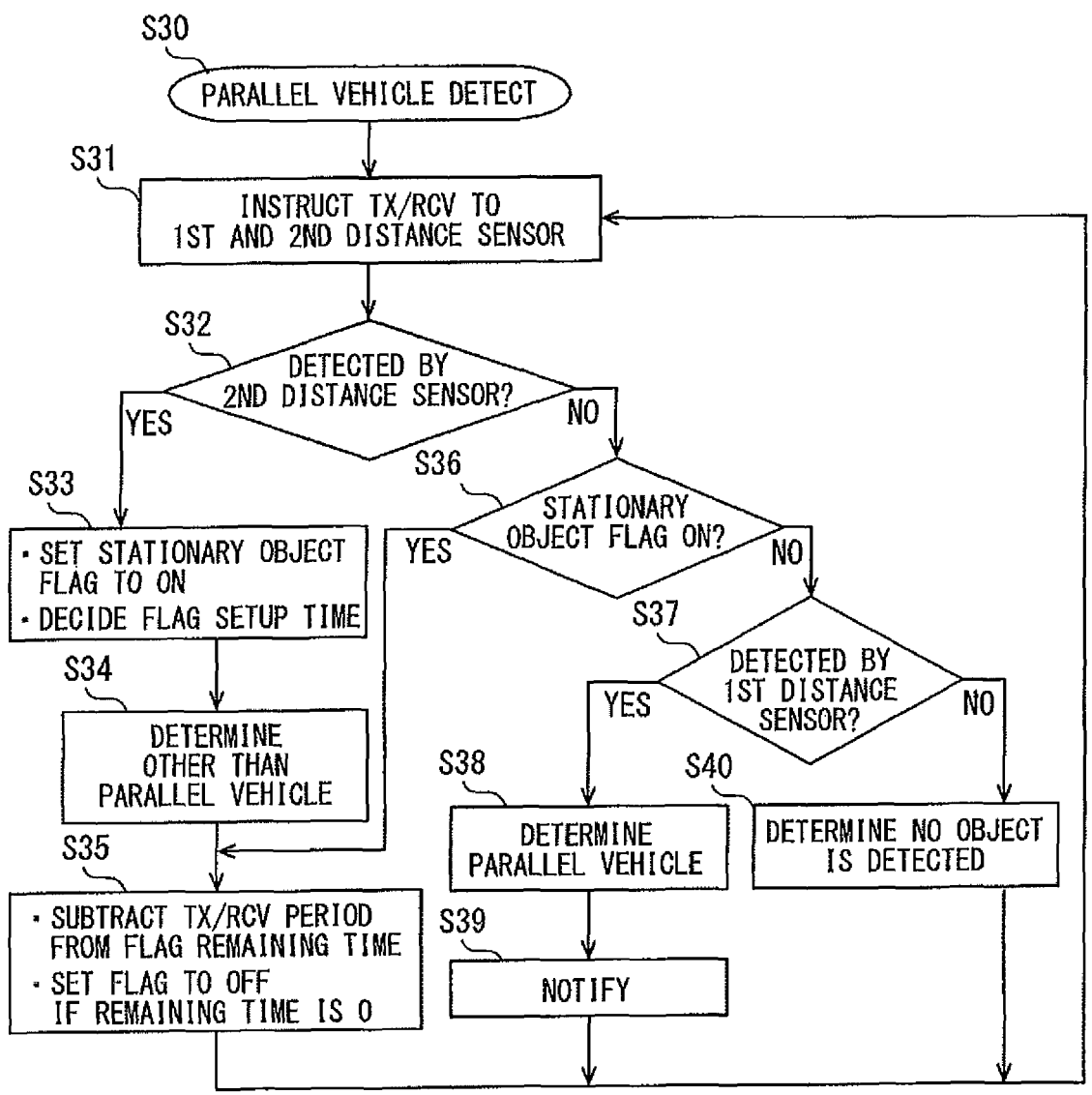
FIG. 5 is a flow chart illustrating the parallel running vehicle detection performed by a controller in Embodiment 3.

Next, Embodiment 3 is explained. The mechanical configuration of Embodiment 3 is the same as that of Embodiment 1, and it has the configuration illustrated in FIG. 1. The difference from Embodiment 1 includes control performed by the controller 60. In Embodiment 3, in lieu of the processing illustrated in FIG. 4, the parallel running vehicle detection S30 illustrated in FIG. 5 is performed.

First, at Step S31, an instruction for transmission and reception is issued to the first distance sensor 10R and the second distance sensor 10F. At Step S32, it is determined whether the second distance sensor 10F has detected an object.

When the second distance sensor 10F has detected an object (YES at S32), at Step S33, a stationary object flag is set to ON, and a flag setup time (corresponding to the suspending period) is determined.

The flag setup time is calculated by dividing a flag setting interval by the current vehicle velocity. In the above, the flag setting interval is determined based on the second detection distance d2. The flag setting interval is an interval that a stationary object 110 (refer to FIGS. 6A and 6B), which has existed in the second detection area 20F as the anterior one of the two detection areas 20R and 20F, moves relatively up to the rear of the first detection area 20R due to the forward traveling of the vehicle 70.

Figure 6A:
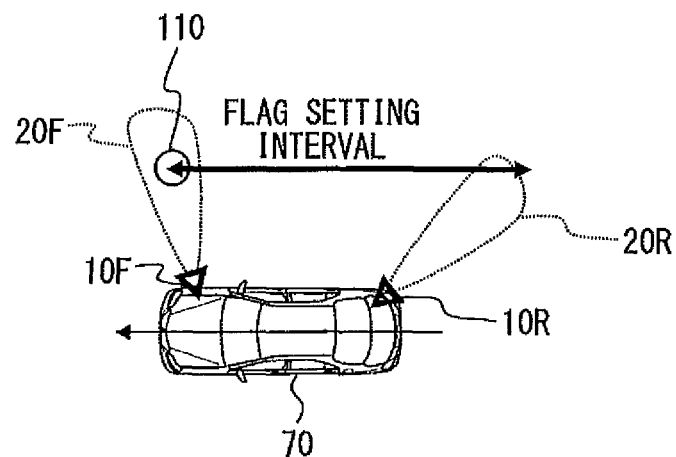
FIG. 6A is a drawing illustrating a flag setting interval when the distance to a stationary object is long.
Figure 6B:
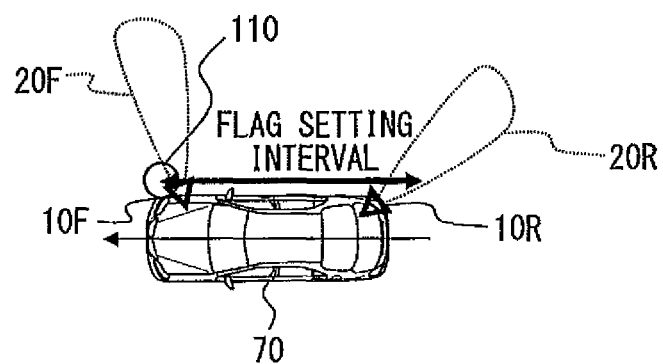
FIG. 6B is a drawing illustrating a flag setting interval when the distance to a stationary object is short.

As illustrated in FIG. 6A and FIG. 6B, the length between the first detection area 20R and the second detection area 20F in the anteroposterior direction of the vehicle 70 becomes longer as it goes farther away from the vehicle 70. Therefore, in the case where the distance to the stationary object 110 is short (FIG. 6B), the flag setting interval becomes short, compared with the case where the distance to the stationary object 110 is long (FIG. 6A). The controller 60 stores a relation between the second detection distance d2 and the flag setting interval in advance, and determines the flag setting interval, based on the relation and the second detection distance d2 detected by the second distance sensor 10F. Then, the flag setup time is determined by dividing the determined flag setting interval by the vehicle velocity.

At Step S33, the stationary object flag is set to ON and the flag setup time is determined, then the flow advances to Step S34. When performing Step S34, the stationary object flag is at ON; therefore, it is determined that the object detected by the second distance sensor 10F is not a parallel running vehicle.

At Step S35, a transmission and reception period is subtracted from the flag remaining time. The flag remaining time expresses the time obtained by subtracting the transmission and reception period from the flag setup time, successively. The transmission and reception period is 50 msec as described above. At Step S35, when the flag remaining time is decreased to 0, the stationary object flag is set to OFF. After performing Step S35, the flow returns to Step S31.

At Step S32, when it is determined that the second distance sensor 10F has not detected an object (NO at S32), the flow advances to Step S36. At Step S36, it is determined whether the stationary object flag is at ON. When the stationary object flag is at ON, the flow advances to Step S35, and the subtraction of the flag remaining time is performed and it is determined whether the flag is set to OFF. Subsequently, the flow returns to Step S31.

When the stationary object flag is set to OFF and the determination at Step S36 is NO, at Step S37, it is determined whether the first distance sensor 10R has detected an object.

When the first distance sensor 10R has detected an object (YES at S37), at Step S38, it is determined that the object detected by the first distance sensor 10R is a parallel running vehicle. At Step S39, the notifier 30 notifies that a parallel running vehicle has been detected. After performing Step S39, the flow returns to Step S31.

When the determination at Step S16 is NO (when the first distance sensor 10R has not detected an object), the flow advances to Step S40 and it is determined that no object is detected. Subsequently, the flow returns to Step S31.

According to Embodiment 3 explained above, when the second distance sensor 10F has detected an object (YES at S32), it is assumed that the object is a stationary object, and the period until this object passes through the first detection area 20R of the first distance sensor 10R (the flag setup time) is set up (S33). Before the present flag setup time has elapsed, determining based on the detection result of the first distance sensor 10R is not performed (YES at S36), therefore, it is possible to suppress erroneously detecting the stationary object detected by the second distance sensor 10F as a parallel running vehicle. Outside of the flag setup time, the number of times of determining required to suppress erroneous detection is not increased. Therefore, it is possible to suppress the degradation of the responsiveness.

Embodiment 4

The mechanical configuration of Embodiment 4 is the same as that of Embodiment 1 except that the second distance sensor 10F is removed from the configuration. The controller 60 performs parallel running vehicle detection S50 illustrated in FIG. 7.

Figure 7:
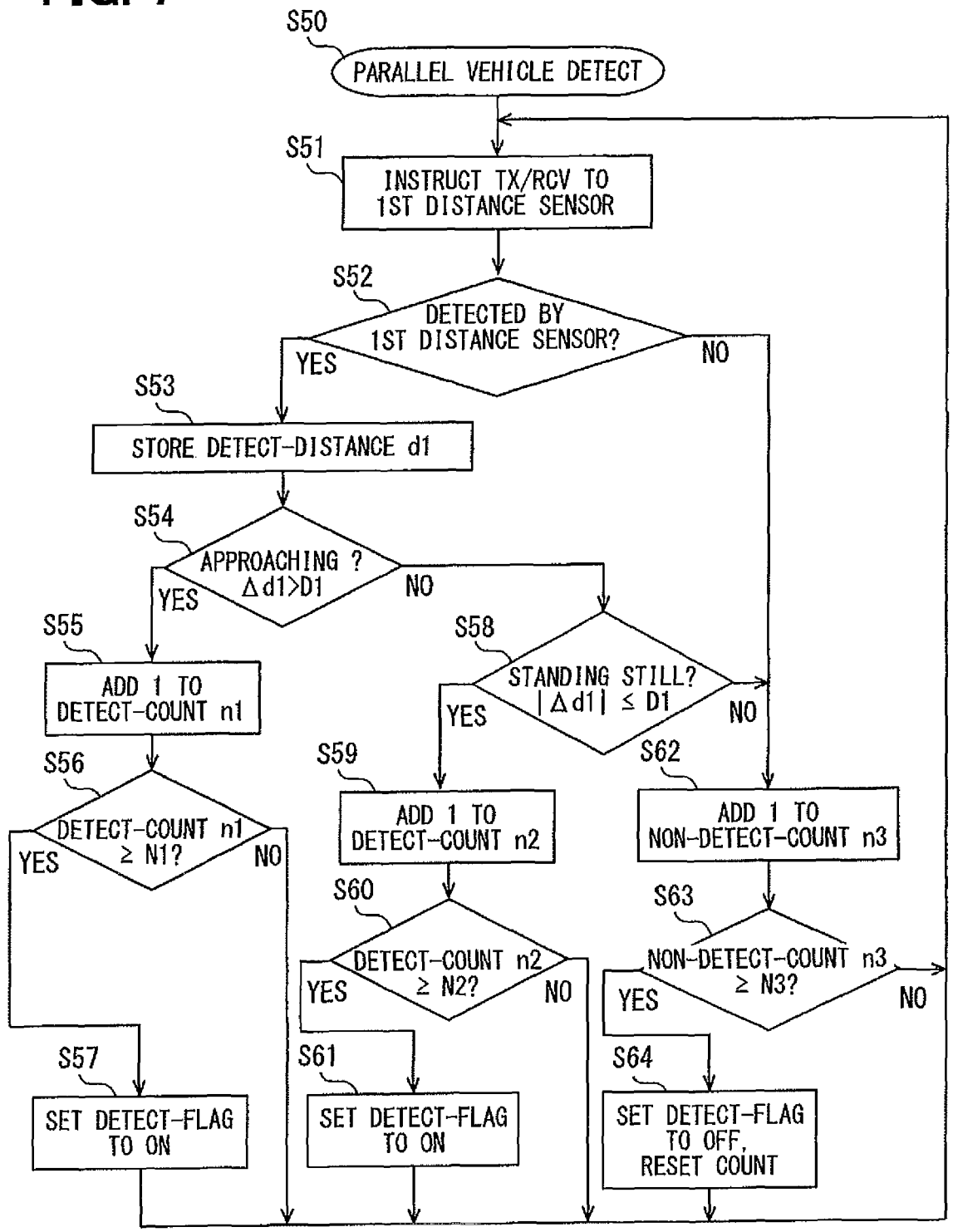
FIG. 7 is a flow chart illustrating the parallel running vehicle detection performed by a controller in Embodiment 4.

In FIG. 7, first, at Step S51, an instruction for transmission and reception is issued to the first distance sensor 10R. At Step S52, it is determined whether the first distance sensor 10R has detected an object.

When the first distance sensor 10R has detected an object (YES at S52), at Step S53, a detection distance d1 is stored to the storage 50. Next, it is determined whether the object detected by the first distance sensor 10R is approaching or not (Step S54). The present determining is performed based on whether the amount of change $\Delta d1$ of the first detection distance d1 (=the preceding value−the current value of the first detection distance d1) is larger than D1.

When it is determined that the object is approaching (YES at S54), the flow advances to Step S55, and the number of times of detection n1 is incremented by +1. Next, it is determined whether the number of times of detection n1 is equal to or greater than the predetermined reference value N1 (Step S56). When the present determining is NO, the flow returns to Step S51. When the determining at Step S56 is YES, the detection flag indicating that the parallel running vehicle has been detected is set to ON (Step S57). In the present embodiment, when the detection flag is set to ON, notification that the parallel running vehicle has been detected is performed from the notifier 30. After performing Step S57, the flow returns to Step S51.

When it is determined that the object is not approaching at Step S54 (NO at S54), the determining at Step S58 is further performed. At Step S58, it is determined whether the object detected by the first distance sensor 10R is standing still.

If an object exists in the first detection area 20R and the object can always be detected by the first distance sensor 10R, it is possible to detect the object when the object is approaching, in other words, when the object enters the first detection area 20R. Therefore, at Step S58, it seems that it is not necessary to determine whether the object is standing still or not.

However, when another vehicle is approaching from the rear lateral side, even if the ultrasonic wave outputted by the first distance sensor 10R is reflected by a front side surface or a lateral side surface of the other vehicle, the reflecting direction is different from the direction of the first distance sensor 10R in most cases, because of the law of reflection, which says that the angle of incidence and the angle of reflection are equal. When the reflection takes place in the neighborhood of a corner of the other vehicle, some reflection may go in the direction of the first distance sensor 10R. However, when reflected by the corner, the reflected wave does not go in the direction of the first distance sensor 10R in many cases, due to the shape of a corner. Therefore, in the state when the other vehicle is approaching to the own vehicle 70, the other vehicle cannot be detected, and only after the other vehicle is located on the lateral side of the own vehicle, the other vehicle, that is, a parallel running vehicle 90, can be detected at last.

Therefore, it is determined at Step S58 whether the object is standing still or not. Determining as to standing still is performed by whether the absolute value of $\Delta d1$ is equal to or less than D1.

When it is determined that the object is standing still (YES at S58), the flow advances to Step S59 and the number of times of detection n2 is incremented by +1. Subsequently, the determining at Step S60 is performed.

At Step S60, it is determined whether the number of times of detection n2 becomes equal to or greater than the predetermined reference value N2. This reference value N2 is set as a larger value than the reference value N1 employed at Step S56. For example, the reference value N1 is set to 3, and the reference value N2 is set to 6.

The reason why the reference value N2 is set as a larger value than the reference value N1 includes the following. In the situation of incrementing the number of times of detection n2, there is a possibility that the detected object is a parallel running vehicle; however, there is also an unignorable degree of possibility that the detected object is not a parallel running vehicle.

For example, the detected object may be a stationary object, such as an electric pole or a curbstone. However, the number of times an object such as an electric pole, which does not continue in the longitudinal direction of a road, is detected under situation where it is determined as being standing still is small. A stationary object which exists continuously, such as a curbstone, is unable to be detected by the first distance sensor 10R each time, even if it is in the first detection area 20R. It is common that the stationary object can be detected at comparatively low frequency, due to the influence of the distance to the vehicle and the direction of the surface which reflects an ultrasonic wave. Therefore, stationary objects such as a curbstone, which exist continuously, cannot be successively detected in such a situation where the stationary object is determined as standing still. On the contrary, a parallel running vehicle is detectable with the first distance sensor 10R, and detectable many times in such a situation where the parallel running vehicle is determined as standing still if there are few distance changes with the own vehicle. Accordingly, in order to detect a parallel running vehicle while suppressing the erroneously detecting and identifying of the stationary object as a parallel running vehicle, the reference value N2 employed when the detected object is standing still is made larger than the reference value N1.

When the determining at Step S60 is NO, the flow returns to Step S51. On the other hand, when the determining at Step S60 is YES, the detection flag indicating that the parallel running vehicle has been detected is set to ON (Step S61). The processing when the detection flag is set to ON is the same as Step S57. After performing Step S61, the flow returns to Step S51.

When the determining at Step S52 is NO (when the first distance sensor 10R has not detected an object) or when the determining at Step S58 is NO (when the object is receding), the flow advances to Step S62 and the number of times of non-detection n3 is incremented by +1. Next, it is determined whether the number of times of non-detection n3 has become equal to or greater than the reference value N3 at Step S63. The value of the reference value N3 is set to 3, for example. When the present determining is NO, the flow returns to Step S51. When the determining at Step S63 is YES, on the other hand, at Step S64, the detection flag is set to OFF and all the number of times of detection n1-n3 are reset. After performing Step S64, the flow returns to Step S51.

According to Embodiment 4 explained above, when the object detected by the first distance sensor 10R is determined as standing still (YES at S58), it is determined whether the object is a parallel running vehicle (S60), through the comparison with the second reference value N2 which has a larger value than when the object detected by the first distance sensor 10R is determined as approaching (YES at S54). Accordingly, when the object determined as standing still is a stationary object, the stationary object is prevented from being detecting as a parallel running vehicle. Moreover, the determination of a parallel running vehicle with the use of the second reference value N2 is restricted to the case where the object is determined as being standing still (YES at S58). When it is determined that the object is approaching (YES at S54), the determining using the first reference value N1 smaller than the second reference value N2 is performed (S56). Therefore, it is possible to suppress the degradation of the detection responsiveness.

Embodiment 5

Figure 8:
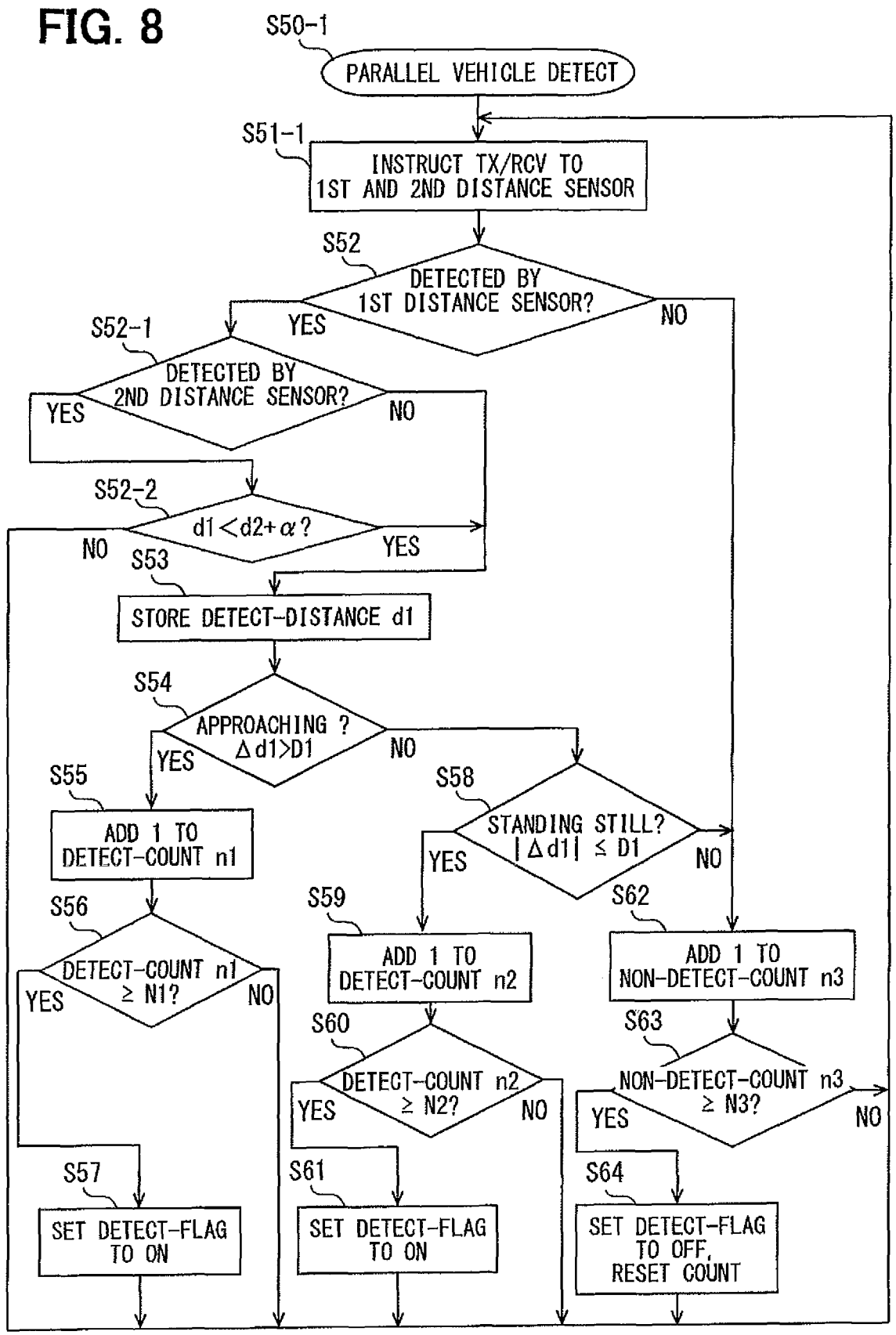
FIG. 8 is a flow chart illustrating the parallel running vehicle detection performed by a controller in Embodiment 5.

The mechanical configuration of Embodiment 5 is the same as that of Embodiment 1, and it has the configuration illustrated in FIG. 1. The parallel running vehicle detection performed by the controller 60 is similar to that in Embodiment 4. FIG. 8 illustrates the parallel running vehicle detection S50-1 performed in Embodiment 5.

The parallel running vehicle detection S50-1 illustrated in FIG. 8 adds Step S52-1 and Step S52-2 to the parallel running vehicle detection S50 according to Embodiment 4. In addition, Step S51-1 is performed in lieu of Step S51 of FIG. 7.

At Step S51-1, the transmission and reception are instructed not only to the first distance sensor 10R but to the second distance sensor 10F.

Then, when it is determined at Step S52 that the first distance sensor 10R has detected an object (YES at S52), at Step S52-1, it is further determined whether the second distance sensor 10F has detected an object. When it is determined that the second distance sensor 10F has not detected an object (NO at S52-1), the flow advances to Step S53. When it is determined that the second distance sensor 10F also has detected an object (YES at S52-1), the flow advances to Step S52-2, and it is determined whether the relation of "the first detection distance d1<the second detection distance d2+α" is satisfied. The present determining is performed to clarify whether the object detected by the first distance sensor 10R is closer to the vehicle 70 than the object detected by the second distance sensor 10F (for example, d1<d2−0.3 m). Here, α is an adjustment value for taking into consideration the detection error, etc. of the detection distances d1 and d2. As described above, Step S52-2 determines whether the object detected by the first distance sensor 10R is closer to the vehicle 70 than the object detected by the second distance sensor 10F. Therefore, α sometimes has a negative value depending on the detection error, etc. of the detection distances d1 and d2.

As the second detection distance d2 employed for the determining, the latest detection distance may be employed, or the minimum value of the second detection distances d2 detected during the past predetermined period to the present time may be employed, or, the average value of the second detection distance d2 detected during the past predetermined period may be employed.

When the determining at Step S52-2 is NO, the object detected by the first distance sensor 10R is more distant from the vehicle 70 than the object detected by the second distance sensor 10F. Even if the object detected by the second distance sensor 10F is an object which continues in the longitudinal direction of a road, such as a curbstone, and a stationary object which does not continue in the longitudinal direction of a road, such as an electric pole, it is hard to consider that the object in a position more distant than the second detection distance d2 to the object is a parallel running vehicle. Accordingly, when the determining at Step S52-2 is NO, the flow returns to Step S51-1.

In contrast, when the determining at Step S52-2 is YES, it is possible that the object detected by the first distance sensor 10R is a motorcycle approaching from the rear on the lateral side. Accordingly, when the determining at Step S52-2 is YES, the flow advances to Step S53.

According to Embodiment 5 explained above, in addition to the first distance sensor 10R for detecting a parallel running vehicle which exists in the area regarded as a blind spot for a driver, the second distance sensor 10F with a detection area different from that of the first distance sensor 10R is provided. Suppose that the second distance sensor 10F has detected the object. In this case, only when the first detection distance d1 to the object detected by the first distance sensor 10R is smaller than the second detection distance d2 to the object detected by the second distance sensor 10F, Step S53 and the followings are performed and it is determined whether the object detected by the first distance sensor 10R is a parallel running vehicle. Therefore, it is possible to detect as a parallel running vehicle a motorcycle which is going to pass through the immediate side of the own vehicle, and at the same time, it is possible to suppress the erroneously detecting and identifying a stationary object, such as a curbstone and an electric pole, as a parallel running vehicle. Since it is possible to suppress the erroneous detection in this way, the number of times of determining in order to suppress the erroneous detection is reduced. Therefore, it is possible to suppress the degradation of the responsiveness.

Embodiment 6

In Embodiment 4 and Embodiment 5, the first reference value N1 and the second reference value N2 are all fixed values; however, in Embodiment 6, the first reference values N1 and the second reference value N2 are variables.

Figure 9:
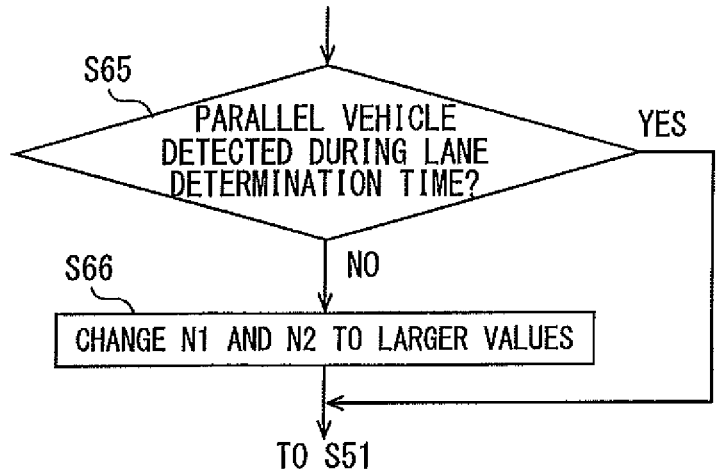
FIG. 9 is a flow chart illustrating a part of the parallel running vehicle detection performed in Embodiment 6.

Specifically, when a parallel running vehicle is not detected for a certain amount of time, for example, 10 minutes, it is highly possible that the road in which the vehicle 70 is traveling does not have multiple lanes but has a single lane. Therefore, as illustrated in FIG. 9, a lane determination time is set up in order to determine whether the traveling road has a single lane or multiple lanes, and it is determined whether it has determined that a parallel running vehicle has been detected during the lane determination time (Step S65).

When the present determining is NO, the flow returns to Step S51. If it is YES, the first reference value N1 and the second reference value N2 are both changed into larger values than up to that time (Step S66). As an example of the concrete numeric values, the first reference value N1 is changed from 3 to 6, and the second reference value N2 is changed from 6 to 9. However, once a parallel running vehicle is detected, the values of the first reference value N1 and the second reference value N2 are returned to the values before changing.

By changing the first reference value N1 and the second reference value N2 to larger values than the values up to that time, it is possible to further suppress the erroneously detecting and identifying of an object which is not a parallel running vehicle as a parallel running vehicle, in the situation where the own vehicle is traveling a single lane road and no parallel running vehicle exists.

The lane determination time is set up based on an experiment. A lane determination distance may be set up in lieu of the lane determination time. The lane determination distance, and the first reference value N1 and the second reference value N2 after change are also set up based on an experiment.

Although not illustrated in FIG. 9, when a parallel running vehicle is detected after changing the first reference value N1 and the second reference value N2, the first reference value N1 and the second reference value N2 are returned to the original value.

Embodiment 7

In Embodiment 7, the first reference value N1 and the second reference value N2 described in Embodiment 4 are set as larger values as the vehicle velocity of the vehicle 70 becomes lower.

That is, in Embodiment 7, a memory device such as a ROM provided in the controller 60 stores the correspondence relation of the vehicle velocity and the first reference value N1, and the correspondence relation of the vehicle velocity and the second reference value N2. These two correspondence relations maintain the relation of "the first reference value N1<the second reference value N2", irrespective of the vehicle velocity, and the values become larger as the vehicle velocity becomes lower. At Step S56 and Step S60, the determination is made with the use of the vehicle velocity at that time and the first reference value N1 and the second reference value N2 which are determined from the correspondence relations.

If the determination at a low vehicle velocity is made with the same reference values N1 and N2 at a high vehicle velocity, the number of times of detection n2 about a stationary object becomes greater than the reference value N2; accordingly, it is likely that an erroneous detection takes place. Demand of responsiveness is not so high when the vehicle velocity is low. Accordingly, when the vehicle velocity is low, priority is given to improvement in the detection accuracy over the responsiveness by enlarging the first reference value N1 and the second reference value N2. Embodiment 7 and Embodiment 6 may be employed in combination.

Embodiment 8

Figure 10:
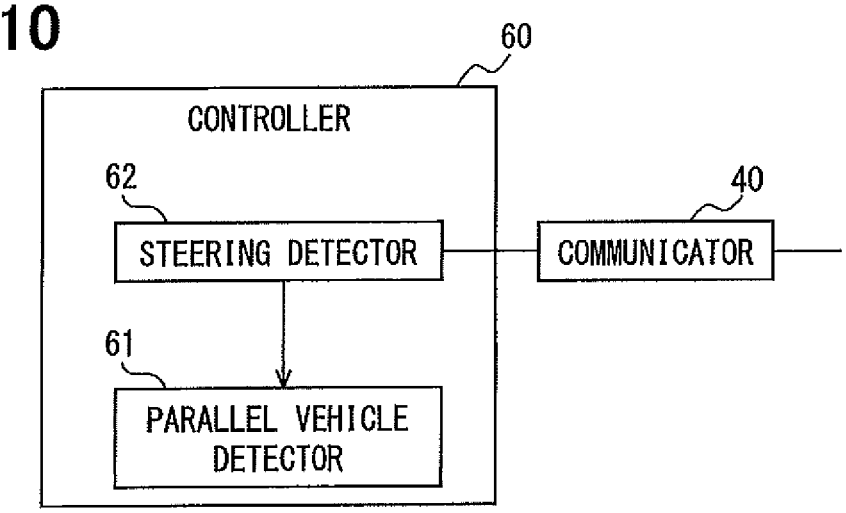
FIG. 10 is a block diagram illustrating function of a controller in Embodiment 8.

As illustrated in FIG. 10, in Embodiment 8, the controller 60 is provided with a parallel running vehicle detector 61 and a steering detector 62 (corresponding to steering detecting means).

The steering detector 62 detects a signal indicative of the steering condition of the vehicle 70. The signal indicative of the steering condition includes a signal from a steering angle sensor and a signal from a yaw rate sensor, for example. These signals are acquired via the communication device 40. Then, the acquired signals are outputted to the parallel running vehicle detector 61.

The parallel running vehicle detector 61 performs one of the parallel running vehicle detection explained in the embodiments described above. However, when the signal indicative of the steering condition teaches that the vehicle 70 is curving, or when the steering angle is larger than 100 degrees, for example, the detection result of the first distance sensor 10R is abolished, and the processing using the detection result of the first distance sensor 10R is not performed in the embodiment described above. In addition, the detection history of the first distance sensor 10R is also abolished.

If the parallel running vehicle detection demonstrated in Embodiment 1 to-Embodiment 7 is performed as it is, while the vehicle is curving, there arises a possibility that an object which is not a parallel running vehicle is erroneously detected as a parallel running vehicle. On the other hand, by performing Modified Example 4, it is possible to further suppress erroneous detection to identify an object which is not a parallel running vehicle as a parallel running vehicle, Embodiment 9

The mounting positions of the first distance sensor 10R and the second distance sensor 10F are not restricted to the positions illustrated in FIG. 2. For example, as illustrated in FIG. 11, the second distance sensor 10F may be mounted at the back-end of the vehicle 70.

Figure 11:
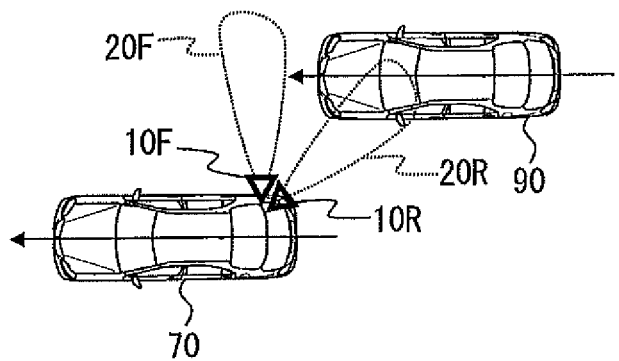
FIG. 11 is a drawing illustrating another example of the installed position of the second distance sensor.

In the example illustrated in FIG. 11, the second distance sensor 10F is mounted on a little front side from the first distance sensor 10R in the back-end of the vehicle 70. The mounting position of the first distance sensor 10R is the same as in FIG. 2. The second detection area 20F points in the same direction as that of FIG. 2 with reference to the vehicle anteroposterior direction, and faces the vehicle lateral side. On the other hand, the first detection area 20R faces the rear lateral side of the vehicle 780.

Embodiment 10

Figure 12:
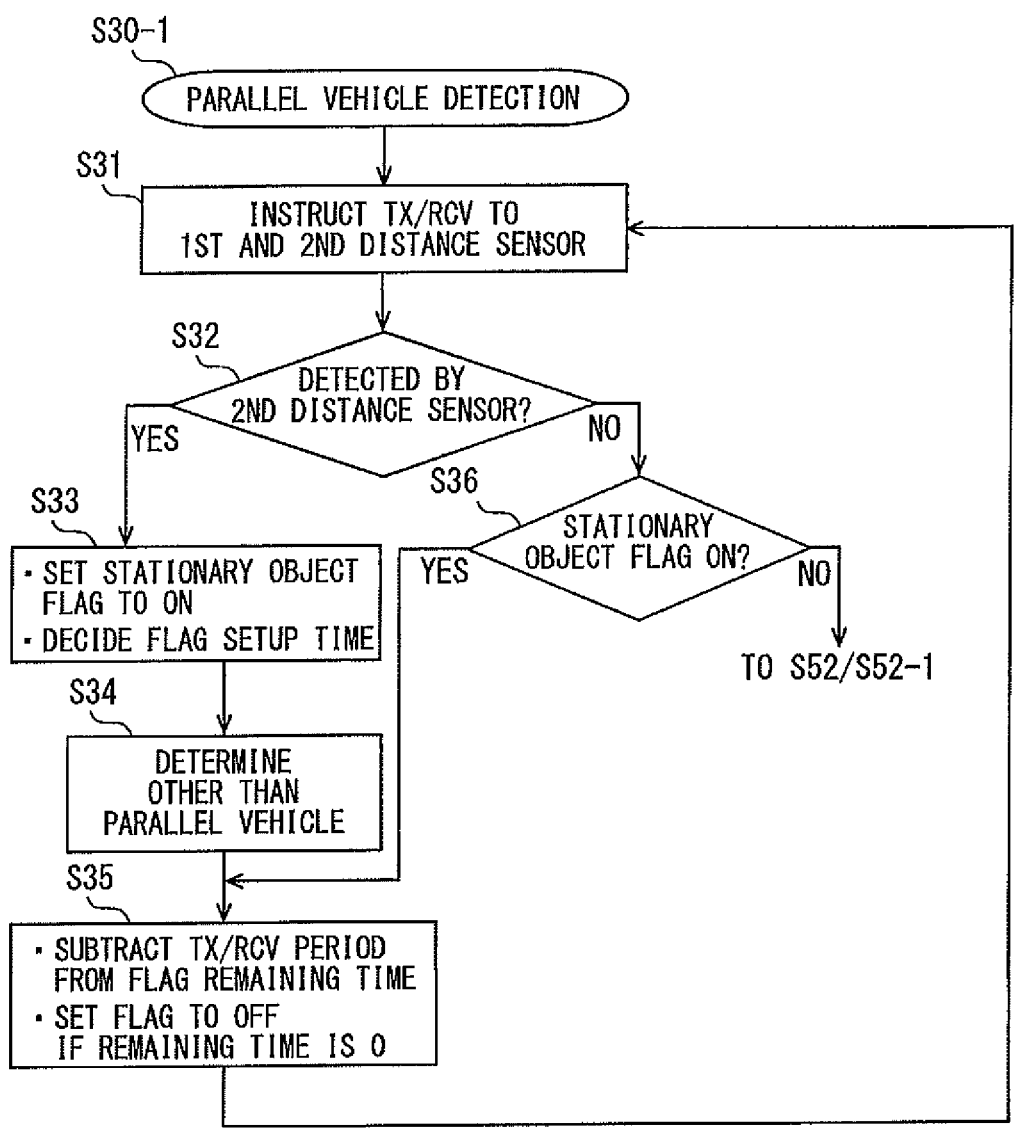
FIG. 12 is a flow chart illustrating the parallel running vehicle detection performed in Embodiment 10.

FIG. 12 is a flow chart illustrating the parallel running vehicle detection performed in Embodiment 10. The flow chart illustrated in FIG. 12 is the same, from Step S31 to Step S36, as that illustrated in FIG. 5 executed in Embodiment 3.

Then, when the determining at Step S36 is NO, the flow advances to Step S52 of FIG. 7 (Embodiment 4), or Step S52-1 of FIG. 8 (Embodiment 5). Step S37 of FIG. 5, which is performed when the determining at Step S36 is NO, and Step S52 of FIG. 7 or Step S52-1 of FIG. 8 are the same processing. Therefore, processing to be performed when the determining at Step S36 is NO can be performed at Step S52 of FIG. 7 or at Step S52-1 of FIG. 8, in lieu of Step S37.

Embodiment 10 advances the flow from FIG. 5 (Embodiment 3) to FIG. 7 (Embodiment 4) or FIG. 8 (Embodiment 5). Therefore, Embodiment 10 produces the effect of those embodiments combined.

However, in Embodiment 10, FIG. 7 and FIG. 8 are modified in part and executed. FIG. 9 is a flow chart illustrating the modified part.

In Embodiments 4 and 5, when the number of times of non-detection n3 becomes equal to or greater than the reference value N3 (for example, N3=3) (YES at S63), Step S64 is performed to set the detection flag to OFF, then the flow returns to the first Step. That is, in Embodiments 4 and 5, when the detection flag is set to OFF, the same processing is performed to detect a parallel running vehicle, irrespective of the state (ON or OFF) of the detection flag before setting the detection flag to OFF at Step S64.

However, when combined with FIG. 3 simply, even if a first parallel running vehicle is immediately followed by a second parallel running vehicle at a short inter-vehicle distance, the passing of the first parallel running vehicle by the side of the own vehicle leads to ON of the stationary object flag. Therefore, the determining at Step S36 becomes YES and the second parallel running vehicle cannot be detected.

Figure 13:
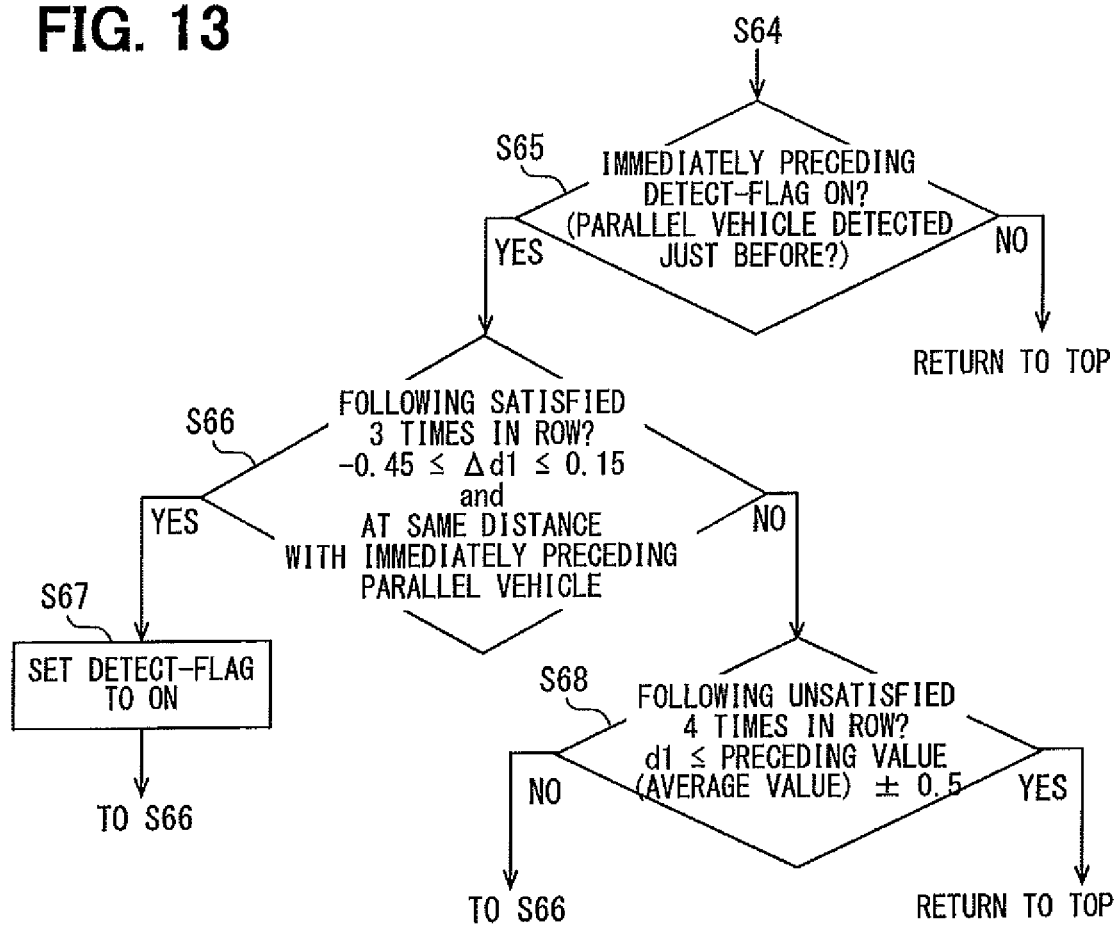
FIG. 13 is a flow chart illustrating the processing performed following FIG. 7 or 8 in Embodiment 10.

Accordingly, in Embodiment 10, when the detection flag is at ON at the time of having advanced to Step S64 (immediately before the detection flag is set to OFF), the parallel running vehicle detection and determination is performed on the condition of Step S66 illustrated in FIG. 13. The determining at Step S66 is for detecting the second parallel running vehicle which is travelling immediately after the first parallel running vehicle at a short inter-vehicle distance.

In FIG. 13, Step S65 is performed after Step S64 of FIG. 7 and FIG. 8. At Step S65, it is determined whether the detection flag has been at ON immediately before the detection flag has been set to OFF at Step S64.

When the immediately preceding detection flag has been at OFF (NO at S65), the flow returns to the first step of the parallel running vehicle detection. When the immediately preceding detection flag has been at ON (YES at S65), the flow advances to Step S66.

At Step S66, it is determined whether the following two conditions are satisfied three consecutive times. The first condition determines whether an amount of change $\Delta d1$ (=the preceding value−the present value) of the first detection distance d1 satisfies that $-0.45$ (m)$\leq \Delta d1 \leq 0.15$ (m). This determining is performed to clarify whether the distance to the object detected by the first distance sensor 10R (the distance in the vehicle width direction as explained with reference to FIG. 3A) changes little from the preceding time. The left-hand term−0.45 (m) and the right-hand term 0.15 (m) are examples. When the object is a parallel running vehicle, the first condition is satisfied.

The second condition defines that the first detection distance is the nearly same distance as the immediately preceding parallel running vehicle. A concrete example of the present condition defines that the first detection distance d1 is within the range of ±0.15 m centering on the detection distance of the immediately preceding parallel running vehicle. The detection distance of the immediately preceding parallel running vehicle employs the distance detected by the first distance sensor 10R immediately before the detection flag is set to ON, or the average value for multiple times of the distance detected by the first distance sensor 10R before the detection flag is set to ON. The first detection distance d1 may employ the average value for two times.

When the determining at Step S66 is YES, the detection flag is set to ON at Step S67. Subsequently, the flow returns to Step S66 again. When the determining at Step S66 is NO, the flow advances to Step S68.

At Step S68, it is determined whether the following condition is not satisfied four consecutive times. This condition is that the first detection distance d1 detected this time is within the range of ±0.15 m with reference to the first detection distance d1 detected at the preceding time (or the average value in multiple times of the first detection distance d1 after starting the processing of FIG. 13). Step S68 determines whether it can be confirmed that the same object that might be a parallel running vehicle has left from the detection area of the first distance sensor 10R, that is, the first detection area 20R. Naturally "three times" at Step S66 and "four times" at Step S68 are examples. However, it may be desirable that the number of times at Step S68 is larger than the number of times at Step S66.

According to Embodiment 10, after detecting a parallel running vehicle, the parallel running vehicle determining is temporarily performed under the condition at Step S66 of FIG. 13. Therefore, it is possible to detect the second parallel running vehicle which travels immediately after the first parallel running vehicle at a short inter-vehicle distance.

In the explanation described above, in the processing of FIG. 5 combined with FIG. 7 or FIG. 8, a part of FIG. 7 or FIG. 8 is changed to one as shown in FIG. 13. However, it may not be necessary to combine FIG. 5. Also in this case, it is possible to enjoy the technical effect that it is possible to promptly detect the second parallel running vehicle which travels immediately after the first parallel running vehicle at a short inter-vehicle distance.

Embodiment 11

Embodiment 11 relates to the object detection determination of the first distance sensor 10R and the second distance sensor 10F, and can be combined with Embodiment 1 to Embodiment 10 described above and Embodiments to be described later.

As explained in Embodiment 1, whether the distance sensors 10R and 10F have detected an object is determined by comparing the magnitude of signals of the distance sensors 10R and 10F with a threshold. As for the threshold, in cases where the gain of a circuit to amplify the signal (hereinafter, circuit gain) is fixed in the embodiments described above, it is possible to employ the threshold which decreases stepwise according to the passage of time after an ultrasonic wave is transmitted, as illustrated in a conceptual diagram of FIG. 14.

The reason to decrease the threshold stepwise is as follows. When an object exists farther away, a longer time is required to detect a reflected wave, and the distance attenuation becomes large as the magnitude of the reflected wave becomes weak. Therefore, the threshold is also decreased stepwise according to the passage of time. The threshold which changes stepwise in this way may be given as a value defined uniquely by the passage of time.

Figure 14:
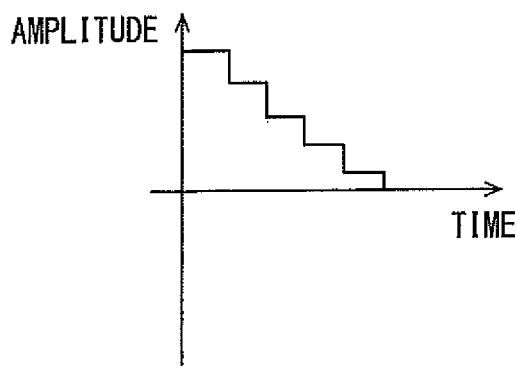
FIG. 14 is a conceptual drawing illustrating a threshold employed by the distance sensor for the object detection.

In cases where the circuit gain is configured so as to compensate the distance attenuation, that is, in cases where the circuit gain is configured so as to become larger by the passage of time after transmitting an ultrasonic wave, it is not necessary to vary the threshold stepwise, unlike the example illustrated in FIG. 14.

Irrespective of whether the configuration is fixing the circuit gain or compensating the distance attenuation, in Embodiment 11, the threshold in Embodiment 11 is made small when the vehicle velocity is high.

Accordingly, when the vehicle velocity is high, another vehicle can be detected promptly. However, not only another vehicle but also a road surface reflection is detected by the distance sensor 10. When the intensity of the road surface reflection is large, there is a possibility of erroneously detecting it as an object. However, when the vehicle velocity is high, the road surface reflection exhibits a high relative velocity, that is, a large frequency difference from the transmitted frequency. In this regard, the distance sensor 10 employs a resonance type sensor generally. Accordingly, the larger the frequency difference from the transmitted frequency is, the more the signal strength of the road surface reflection decreases. Therefore, by making the threshold small when the vehicle velocity is high, it is possible to detect another vehicle promptly, suppressing the erroneous detection. If the threshold is made small even when the vehicle velocity is low, the risk of erroneous detection may increase on a bad road. Therefore, the threshold at a low vehicle velocity may be set to a larger value than the threshold at a high vehicle velocity.

Determining of a high vehicle velocity is performed by whether the current vehicle velocity is higher or lower than a reference vehicle velocity. The reference vehicle velocity is defined as a velocity which can be determined to be a high speed running (80 km/h, etc.), for example.

Embodiment 12

The explanation made above is about a parallel running vehicle detection while the own vehicle is moving. As compared with this, Embodiment 12 detects a parallel running vehicle while the own vehicle is stopped. A parallel running vehicle in the state where the own vehicle is at the stop, that is, is not traveling, signifies a motorcycle on the nearest lateral side of the own vehicle (at a nearer distance than the other vehicle in the adjacent lane).

Figure 15:
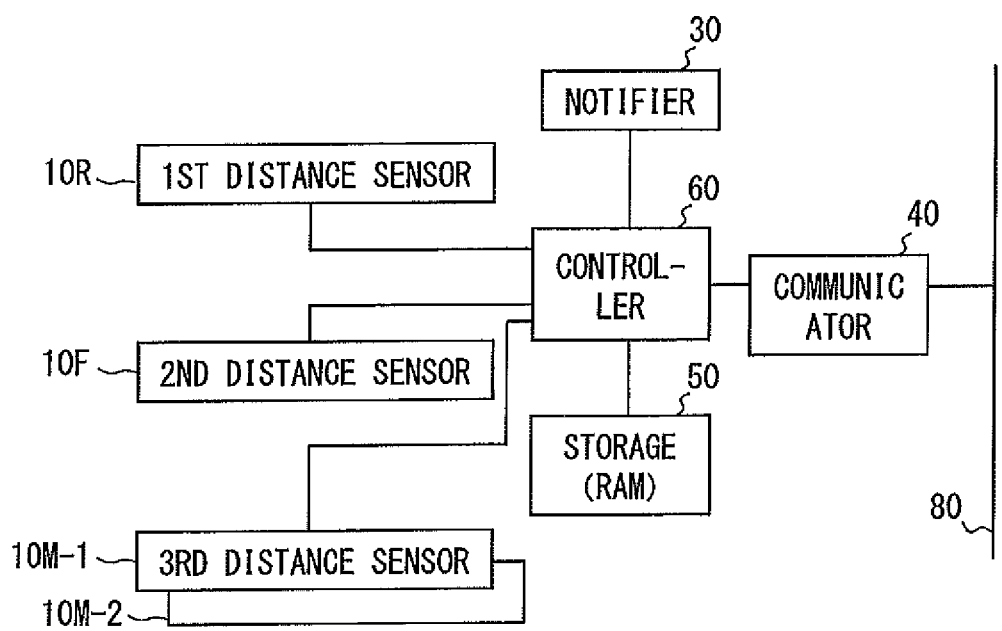
FIG. 15 is a block diagram illustrating a configuration of a parallel running vehicle detecting apparatus according to Embodiment 12.

In Embodiment 12, as illustrated in FIG. 15, a third distance sensor 10M is provided in addition to the configuration according to Embodiment 1 (FIG. 1). The third distance sensor 10M is the so-called back sonar, normally provided with multiple sensors. However, only one sensor may be provided. In the present embodiment, the vehicle velocity is acquired via the communication device 40 and the CAN 80.

Figure 16:
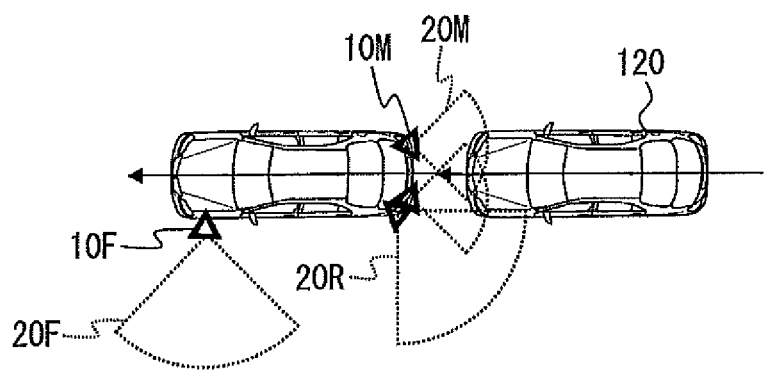
FIG. 16 is a drawing illustrating the detection area of the first, the second, and the third distance sensor.

FIG. 16 illustrates the detection areas 20R, 20F, and 20M of the first, the second, and the third distance sensors 10R, 10F, and 10M, respectively. The detection area 20M of the third distance sensor 10M is an area from the immediate rear to the back lateral side of the own vehicle with respect to the vehicle width direction, and is an area nearest to the rear of the own vehicle with respect to the vehicle anteroposterior direction.

As seen from FIG. 16, a following vehicle 120 which travels right behind of the own vehicle is detected by both of the first distance sensor 10R and the third distance sensor 10M. At this time, the detection distances d1 and d3 by both sensors 10R and 10M are mostly in agreement. In Embodiment 12, the following vehicle 120 and the parallel running vehicle 140 (FIG. 18) are distinguished utilizing this feature.

Figure 17:
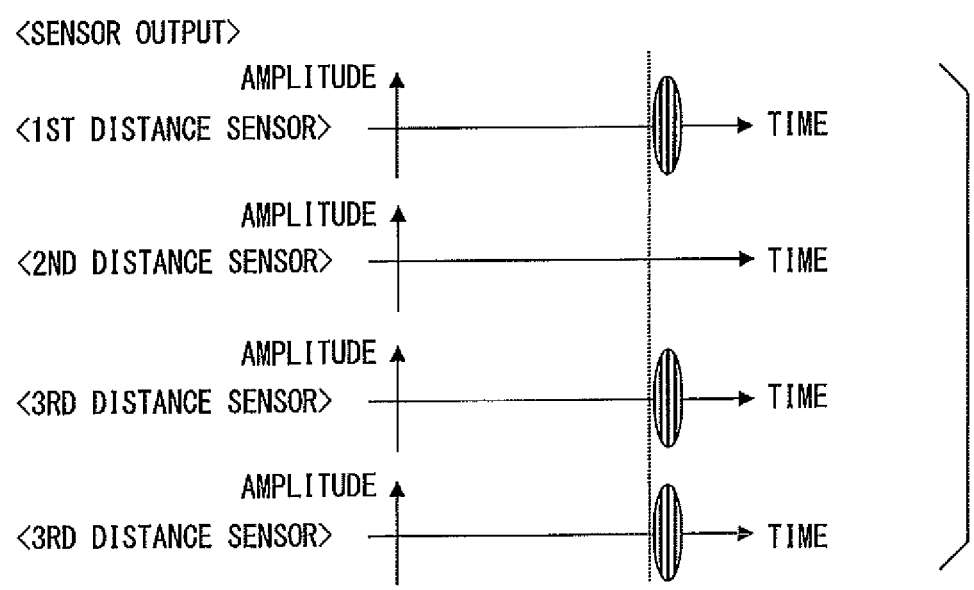
FIG. 17 is a drawing illustrating the sensor output of the first, the second, and the third distance sensor in the state of FIG. 16.
Figure 19:
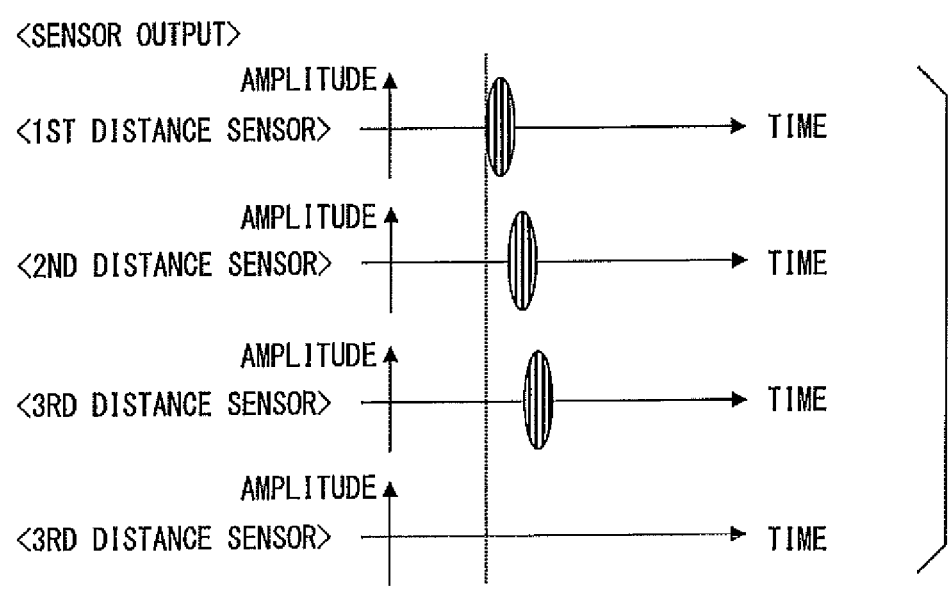
FIG. 19 is a drawing illustrating the sensor output of the first, the second, and the third distance sensor in the state of FIG. 18.

FIG. 17 illustrates the sensor output of the first distance sensor 10R, the second distance sensor 10F, and the third distance sensor 10M in the state of FIG. 16. FIG. 17 and FIG. 19 (to be illustrated later) illustrate conceptually only a reflected wave. Actually, as illustrated in FIG. 3B, a transmitted wave, a small signal between the transmitted wave and the reflected wave, etc. can be observed.

It is seen also from FIG. 17 that when a following vehicle 120 exists, the detection distance d1 by the first distance sensor 10R and the detection distance d3 by the third distance sensor 10M are mostly in agreement.

Figure 18:
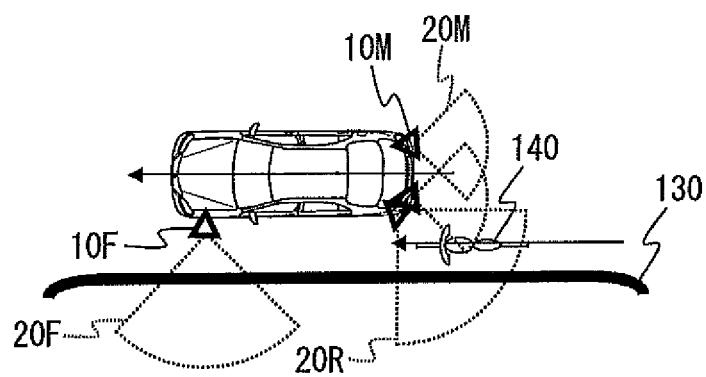
FIG. 18 is a drawing illustrating a state where a parallel running vehicle is going to pass through between an own vehicle and a guard rail.

FIG. 18 illustrates the state in which a parallel running vehicle (motorcycle) 140 is about to pass through between the own vehicle and a guard rail 130, and at present, the parallel running vehicle 140 is in the blind spot region of the own vehicle.

FIG. 19 illustrates the sensor outputs of the first, the second, and the third distance sensors 10R, 10F, and 10M in the state of FIG. 18. As seen from FIG. 19, when the parallel running vehicle 140 exists between the own vehicle and the guard rail 130, the detection distance d1 by the first distance sensor 10R is shorter than the detection distances d2 and d3 by the second and the third distance sensors 10M.

Figure 20:
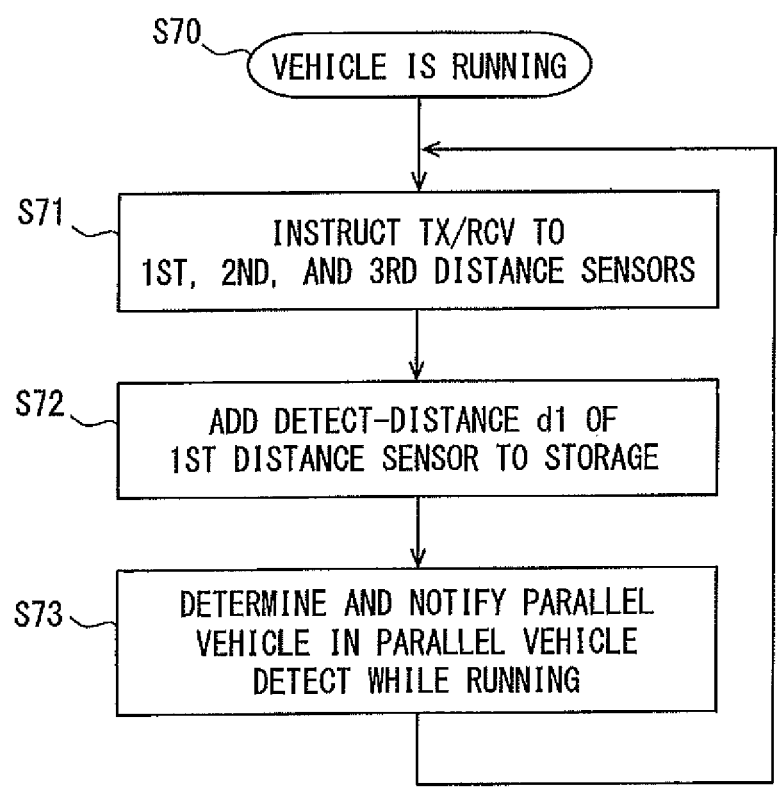
FIG. 20 is a flow chart illustrating the processing performed while the vehicle is moving in Embodiment 12.

FIG. 20 illustrates the processing S70 performed while the vehicle is moving in Embodiment 12. At Step S71, an instruction for transmission and reception is issued to the first, the second, and the third distance sensors 10R, 10F, and 10M. At Step S72, the detection distance d1 of the first distance sensor 10R is stored to the storage 50. When the total number of data stored reaches an upper limit, the oldest data is abolished and the present first detection distance d1 is stored instead.

At Step S73, by performing the parallel running vehicle detection while the vehicle is running, explained in the embodiments above, the determination and notification of the parallel running vehicle is performed.

Figure 21:
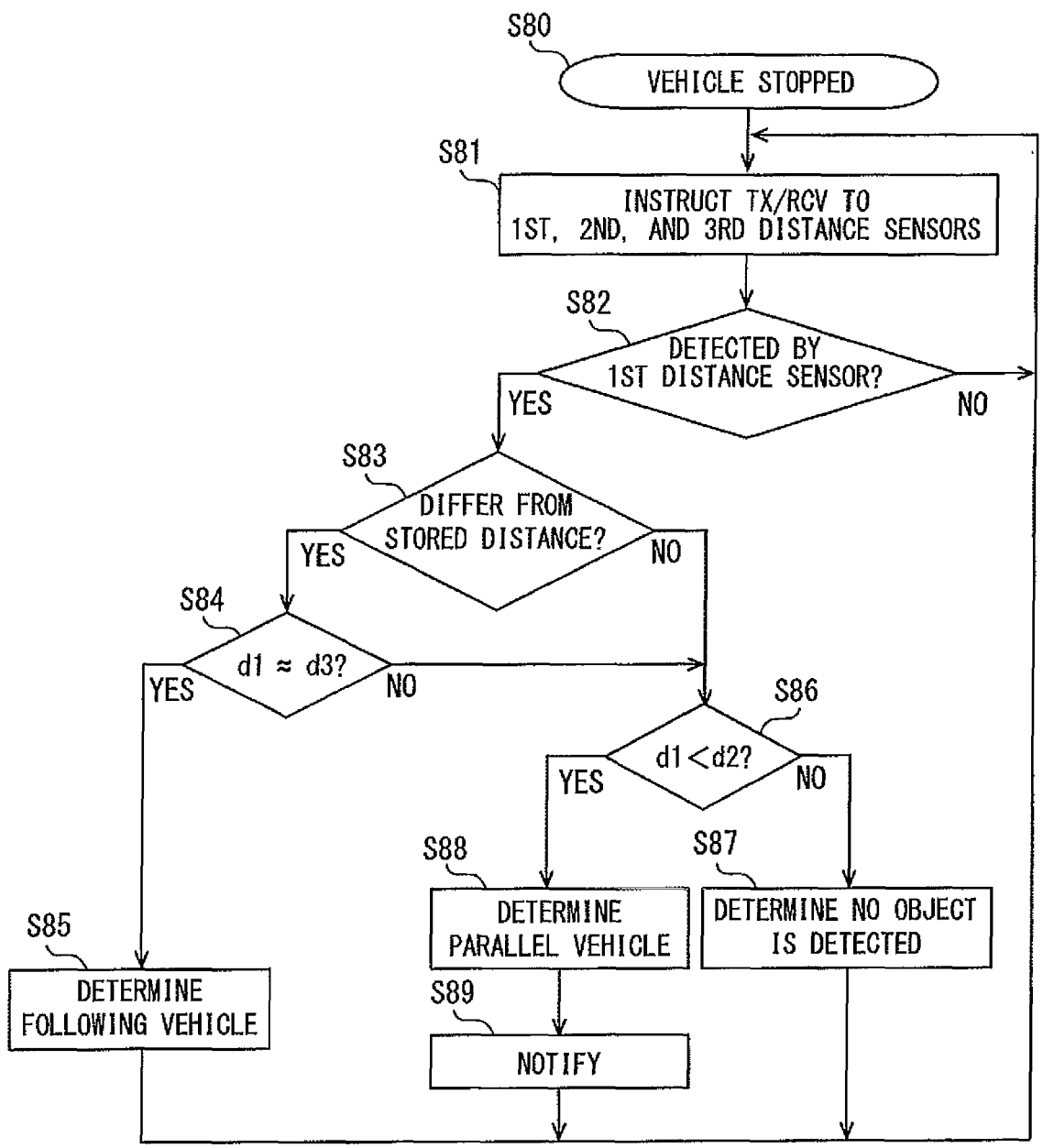
FIG. 21 is a flow chart illustrating the processing performed while the vehicle is stopped in Embodiment 12.

FIG. 21 illustrates processing S80 to be started when a stop is detected. The stop is detected using the vehicle velocity acquired via the CAN 80 and the communication device 40.

At Step S81, an instruction for transmission and reception is issued to the first, the second, and the third distance sensors 10R, 10F, and 10M. At Step S82, it is determined whether the first distance sensor 10R has detected an object. When it is determined that the first distance sensor 10R has not detected an object (NO at S82), the flow returns to Step S81. When it is determined that the first distance sensor 10R has detected an object (YES at S82), the flow advances to Step S83.

At Step S83, it is determined whether there is a difference between the first detection distance d1 stored in the storage 50 and the first detection distance d1 detected this time. This determining is performed to determine whether the object determined to have been detected at Step S82 is the object continuously detected since the vehicle was running.

When the difference between the first detection distance d1 stored in the storage 50 and the first detection distance d1 detected this time is smaller than the reference value which is set up based on the detection error, it is determined that there is no difference. It is only necessary for the first detection distance d1 stored in the storage 50 to indicate the distance to the object continuously detected while the vehicle is running. For example, the average value of the values for the past predetermined period with the completion time at the time of detecting a stop, or the average value of fixed numbers in the past, etc. are employed. Only the one latest value may be employed.

When there is no difference, the object detected by the first distance sensor 10R is an object continuously detected while the vehicle is running. When it is determined that there is no difference (NO at S83), the flow advances to Step S86.

When there is a difference, the object detected by the first distance sensor 10R is an object which had not been detected while the vehicle is running. When it is determined that there is a difference (YES at S83), the flow advances to Step S84.

At Step S84, it is determined whether the third detection distance d3 is the same as the first detection distance d1 obtained as a result of processing at the immediately preceding Step S81. As described above, when the flow advances to Step S84, the object detected by the first distance sensor 10R is an object which had not been detected while the vehicle is running. That is, the object which is detected by the first distance sensor 10R is a moving object. A moving object detected in the state where the own vehicle is stopped on a road is considered as any one of a following vehicle, a parallel running vehicle, and another vehicle which comes to the side of the own vehicle on the adjacent lane. Among these, only for the following vehicle, the first detection distance d1 and the third detection distance d3 become the same. Here, "the same" includes not only the case of being completely the same, but also the case of being substantially the same, that is, the case of being almost the same. Whether it is almost the same or not is determined by whether the difference of the first detection distance d1 and the third detection distance d3 is smaller than a determination value in consideration of the detection error involved.

When the determining at Step S84 is YES, the flow advances to Step S85 and it is determined that the object detected by the first distance sensor 10R is a following vehicle.

When the determining at Step S84 is NO, the flow advances to Step S86. Advancing to Step S86 includes (1) the case where the object detected by the first distance sensor 10R has been detected while the vehicle is running (NO at S83), (2) the case where the object detected by the first distance sensor 10R is a parallel running vehicle 140 in the state of FIG. 18, and (3) the case where the object detected by the first distance sensor 10R is another vehicle which comes to the side of the own vehicle on the adjacent lane (NO at S84). The object detected while the vehicle is running in the case (1) may include (1-1) a stationary object such as a guard rail 130, or (1-2) a parallel running vehicle in the state of standing still described in the previous embodiment. Among (1-1), (1-2), (2), and (3), (1-2) and (2) need to be notified while the vehicle is stopped, and (1-1) and (3) need not to be notified. Both of (1-2) and (2) satisfy the relation of "the first detection distance d1<the second detection distance d2." On the other hand, both of (1-1) and (3) do not satisfy the relation of "the first detection distance d1<the second detection distance d2."

Accordingly, at Step S86, it is determined whether the relation of "the first detection distance d1<the second detection distance d2" is satisfied. The distance detected by the processing of the immediately preceding Step S81 is employed for the second detection distance d2. However, when the second distance sensor 10F has not detected any object, the second detection distance d2 detected before the vehicle has stopped is employed. When the second detection distance d2 before the vehicle has stopped is employed, the second detection distance d2 is also stored to the storage 50 at Step S72 of FIG. 20.

When the determining at Step S86 is NO, it is highly likely that the object detected by the first distance sensor 10R is (1-1) a stationary object such as a guard rail 130, or (3) another vehicle which comes to the side of the own vehicle on the adjacent lane. Accordingly, the flow advances to Step S87, and it is determined that no object is detected. Subsequently the flow returns to Step S81.

When the determining at Step S86 is YES, the object detected by the first distance sensor 10R is considered as (1-2) a parallel running vehicle in the state of being standing still, or (2) a parallel running vehicle 140 in the state of FIG. 18. Accordingly, the flow advances to Step S88 and it is determined that the object is a parallel running vehicle. Subsequently, the flow advances to Step S89, and the notifier 30 notifies that a parallel running vehicle has been detected.

As described above, in Embodiment 12, in the state where the own vehicle is stopped, it is possible to detect a motorcycle on the nearest lateral side of the own vehicle as a parallel running vehicle (S88), and to make the notification (S89). In the state where the own vehicle is stopped, there is a possibility of erroneously detecting a following vehicle 120 as a parallel running vehicle 140. However, in Embodiment 12, when the object is a following vehicle 120, the first detection distance d1 and the third detection distance d3 are almost equal. Accordingly, the following vehicle 120 is determined by comparing the first detection distance d1 with the third detection distance d3 (S84). Therefore, it is possible to suppress the erroneously detecting and identifying a following vehicle as a parallel running vehicle.

The present disclosure is not limited to the above-described embodiments, and the following embodiments are also included in the embodiments of the present disclosure, and furthermore, various changes in addition to the following can also be considered as one of the embodiments.

For example, in the above-described embodiment, the first detection area 20R and the second detection area 20F are set so as not to overlap at all; however, a part of the detection areas may overlap with each other (Embodiment 13).

In Embodiment 3, in lieu of the flag setup time, a flag setting interval (corresponding to the suspending distance) may be employed (Embodiment 14). When employing the flag setting interval, the flag setting interval is determined at Step S33, and the mileage from the flag setting time is subtracted from the flag remaining interval at Step S35. Then, if the flag remaining interval is 0, the flag is set to OFF.

The first distance sensor 10R and the second distance sensor 10F may not be restricted to the ultrasonic type, but may be an electromagnetic wave type, an optical type, and others (Embodiment 15).

The controller 60 which performs the parallel running vehicle detection (S10, S30, S30-1, S50, S50-1, and S80) in the above-described embodiments can corresponds to an example of the parallel running vehicle detector and parallel running vehicle detector.

The embodiments and the configurations of the present disclosure have been illustrated in the above, however, the embodiments and the configurations according to the present disclosure are not limited to each of the embodiments and each of the configurations described above. For example, embodiments and configurations which are obtained by combining suitably the technical parts respectively disclosed in the different embodiments and configurations are also included in the embodiment and the configuration according to the present disclosure.

The invention claimed is:

1. An apparatus for a vehicle, comprising:
a first distance sensor that is mounted on the vehicle and that detects a distance to an object which exists in a first detection area around the vehicle, the first distance sensor being an ultrasonic sensor,
wherein:
the first distance sensor detects the object by comparing an intensity of a signal detected by the first distance sensor with a threshold that is set based on a velocity of the vehicle;
the threshold being set to a first value when the velocity of the vehicle is greater than a reference vehicle velocity and being set to a second value when the velocity of the vehicle is lower than the reference vehicle velocity, the first value being less than the second value.

2. The apparatus of claim 1 wherein the first distance sensor is a resonance type sensor.

* * * * *